US012347920B2

(12) United States Patent
Ponn et al.

(10) Patent No.: US 12,347,920 B2
(45) Date of Patent: Jul. 1, 2025

(54) MOBILE COMMUNICATION ANTENNA

(71) Applicant: Telefonaktiebolaget LM Ericsson (publ), Stockholm (SE)

(72) Inventors: Philipp Ponn, Rosenheim (DE); Philipp Karl Gentner, Vienna (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 18/246,723

(22) PCT Filed: Dec. 22, 2020

(86) PCT No.: PCT/EP2020/087677
§ 371 (c)(1),
(2) Date: Mar. 27, 2023

(87) PCT Pub. No.: WO2022/063422
PCT Pub. Date: Mar. 31, 2022

(65) Prior Publication Data

US 2023/0352811 A1 Nov. 2, 2023

(30) Foreign Application Priority Data

Sep. 27, 2020 (EP) .................................... 20198575

(51) Int. Cl.
*H01Q 1/24* (2006.01)
*H01Q 19/10* (2006.01)
*H01Q 21/24* (2006.01)

(52) U.S. Cl.
CPC ........... *H01Q 1/241* (2013.01); *H01Q 19/108* (2013.01); *H01Q 21/24* (2013.01)

(58) Field of Classification Search
CPC ...... H01Q 1/241; H01Q 19/108; H01Q 21/24; H01Q 1/1207; H01Q 1/42; H01Q 21/26; H01Q 1/246
See application file for complete search history.

(56) References Cited

U.S. PATENT DOCUMENTS

| | | | |
|---|---|---|---|
| 5,896,107 | A | 4/1999 | Huynh |
| 2009/0066602 | A1 | 3/2009 | Lindberg et al. |

(Continued)

FOREIGN PATENT DOCUMENTS

| | | | |
|---|---|---|---|
| EP | 3361567 A1 | 8/2018 | |
| WO | 2019056905 A1 | 3/2019 | |

(Continued)

OTHER PUBLICATIONS

International Search Report and Written Opinion for International Patent Application No. PCT/EP2020/087677, mailed Jun. 15, 2021, 14 pages.

*Primary Examiner* — David E Lotter

(74) *Attorney, Agent, or Firm* — Withrow & Terranova, PLLC

(57) ABSTRACT

A mobile communication antenna comprises reflector arrangement, a plurality of dual-polarized radiators and a first support frame structure. The first support frame structure comprises a first support section and a second support section. The first and second support sections extend in the longitudinal direction of the mobile communication antenna. The first support frame structure comprises a connecting element which connects the first and second support sections in a bridge-like manner and spans a first receiving room. The first support frame structure is directly or indirectly connected to the reflector arrangement. The connecting element comprises a plurality of mounting sections, wherein a dual-polarized radiator is mounted on at least some or all of the mounting sections.

27 Claims, 19 Drawing Sheets

(56) References Cited

U.S. PATENT DOCUMENTS

2012/0280874 A1* 11/2012 Kim ........................ H01Q 21/08
343/763
2014/0062826 A1* 3/2014 Jonsson ................. H01Q 1/246
343/893
2015/0002356 A1* 1/2015 Urbasic .................... H01Q 1/42
343/832

FOREIGN PATENT DOCUMENTS

WO 2020010039 A1 1/2020
WO 2020072880 A1 4/2020

* cited by examiner

MOBILE COMMUNICATION ANTENNA

This application is a 35 U.S.C. § 371 national phase filing of International Application No. PCT/EP2020/087677, filed Dec. 22, 2020, which claims the benefit of European Patent Application No. 20198575.1, filed Sep. 27, 2020, the disclosures of which are incorporated herein by reference in their entireties.

TECHNICAL FIELD

The invention relates to a mobile communication antenna which is used to transmit and receive mobile communication signals, for example from cell phones.

BACKGROUND

Mobile communication antennas are usually used to establish a communication to cell phones. Those mobile communication antennas are normally mounted on masts for example. The mobile communication antennas are also optimized for the customer. Radiators used within the mobile communication antenna are chosen for the respective mobile communication bands and the number of communication bands the customer wants to operate the mobile communication antenna for. Therefore, a lot of different versions of the mobile communication antenna exist. This increases the requirements in the manufacturing process. Furthermore, a lot of cables are used for wiring the mobile communication antenna. This increases the production time and enhances the production costs and could also lead to faulty wirings that have to be corrected afterwards.

As such, it would be desirable to have a mobile communication antenna that can be produced more easy so that the individual customer needs can fully be considered.

SUMMARY

An object of the present invention is seen in building a mobile communication antenna, wherein the individual requirements of the customer can be addressed and wherein the electrical parameters are reproducible.

The object is solved by a mobile communication antenna according to claim 1. Claims 2 to 24 describe further embodiments of the mobile communication antenna.

The mobile communication antenna according to the present invention comprises a reflector arrangement and a plurality of dual-polarized radiators. A reflector arrangement could be a single electrically conductive piece or a plurality of electrically conductive pieces like metal sheets for example. A reflector arrangement could also comprise a dielectric which is covered with an electrically conductive material. Furthermore, at least a first support frame structure is used, wherein the first support frame structure comprises a first support section and a second support section. The first support section and the second support section are arranged side by side and extend in the longitudinal direction of the mobile communication antenna. The first support frame structure comprises a connecting element which connects the first and second support sections in bridge-like manner and spans a first receiving room. The first support frame structure is arranged on the first side of the reflector arrangement and is directly or indirectly connected to the reflector arrangement. The wording "directly" is understood in such a way that the first support frame structure is in contact with the reflector arrangement and the wording "indirectly" is understood in such a way that for example other elements, like a profile arrangement, are in contact with the reflector arrangement, wherein the first support frame structures only in contact with those elements. The connecting element comprises a plurality of mounting sections, wherein dual-polarized radiator is mounted on at least some or all of the mounting sections. The dual-polarized radiators are spaced apart from one another on the first side of the reflector arrangement at least in the longitudinal direction of the mobile communication antenna.

It is very beneficial that the first support frame structure is used, which is made (preferably fully) of a dielectric material like plastic. Dual-polarized radiators can then be added to the first support frame structure, wherein the first support frame structure is then added to the first side of the reflector arrangement. Different requirements of a customer therefore result in a different support frame structures and/or different dual-polarized radiators. A lot of components are pre-manufactured and then only added doing manufacturing.

In another embodiment of the present invention, a second support frame structure is provided. The second support frame structure is arranged next to the first support frame structure and preferably the first and the second support frame structures extend on the same length in the longitudinal direction of the mobile communication antenna and more preferably also extend in the same height (away from the reflector arrangement). Alternatively, the second support frame structure could also be arranged at least partially in the first receiving room of the first support frame structure. The second support frame structure comprises a first support section and a second support section. The first support section and a second support section are arranged side by side and extend in the longitudinal direction of the mobile communication antenna. The second support frame structure is also made (preferably fully) of a dielectric material like plastic. The second support frame structure comprises a connecting element which connects the first and the second support sections in the bridge-like manner and spans a second receiving room. The second support frame structure is arranged on the first side of the reflector arrangement and is also directly or indirectly connected to the reflector arrangement. The connecting element comprises a plurality of mounting sections, wherein a dual-polarized radiator is mounted on at least some or all of the mounting sections, wherein the dual-polarized radiators are spaced apart from one another on the first side of the reflector arrangement at least in the longitudinal direction of the mobile communication antenna. It is very beneficial, that simply a second support frame structure can be added if the customer wants the mobile communication antenna to support additional mobile communication bands for example.

In another embodiment of the present invention, a second and a third support frame structure are provided, wherein the second and the third frame structure are arranged next to each other and are at least partially arranged in the first receiving room of the first support frame structure. The second and the third support frame structure are made (preferably fully) of the dielectric material like plastic. The second and the third frame structures each comprise a first support section and a support section. The first support section and a second support section of the respective first and second support frame structures are arranged side by side and extend in the longitudinal direction of the mobile communication antenna. The second support frame structure comprises a connecting element which connects the first and the second support sections of the second support frame structure in the bridge-like manner thereby spanning a receiving room. The third support frame structure also comprises a connecting element which connects the first and the second support sections in bridge-like manner thereby spanning a third receiving room. The second and the third support frame structures are arranged on the first side of the reflector arrangement and are directly or indirectly connected to the reflector arrangement. The connecting element of the respective second and third support frame structures comprises a plurality of mounting sections, wherein a dual-polarized radiator is mounted on at least some or all of the mounting sections, wherein the dual-polarized radiators on each connecting element are arranged on the first side of the reflector arrangement and are spaced apart from one another in at least the longitudinal direction of the mobile communication antenna. Dual-polarized radiators arranged on the first support frame structure are placed further away from the reflector arrangement than dual-polarized radiators arranged on the second or third support frame structure. As such, the dual-polarized radiators arranged on the first support frame structure are preferably configured to be operated in the low band, wherein dual-polarized radiators arranged on the second and third support frame structures are preferably configured to be operated in the mid band. It is very beneficial that the second and the third support frame structures are arranged at least partly within the first receiving room. Therefore, modular construction is achieved. If the customer needs a mobile communication antenna that can be operated in the low band, the first support frame structure is added, wherein the second and the third support frame structures are added if the customer requires operation of the mobile communication antenna in the mid band.

In another embodiment of the present invention, one or more spacers are arranged between the connecting element of the first support frame structure and the connecting element of the second support frame structure and one or more spacers are arranged between the connecting element of the first support frame structure and the connecting element of the third support frame structure. This increases the stability between the first support frame structure and the second and third support frame structures. In addition or alternatively, one or more spacers are arranged between the connecting element of the second support frame structure and the reflector arrangement and/or between the connecting element of the third support frame structure and the reflector arrangement. This increases the stability of the second support frame structure and the third support frame structure. In addition or alternatively, one or more spacers are arranged between the connecting element of the first support frame structure and the reflector arrangement. This increases the stability of the first support frame structure. The first, second and/or third support frame structures and the respective spacers are preferably made of a single piece.

In another embodiment of the present invention, the first support section of the first, second and/or third support frame structure comprises at least one fastening means or a plurality of fastening means which are spaced apart in the longitudinal direction of the mobile communication antenna and which are arranged at least partly on the second side of the reflector arrangement, wherein an electronic module, especially in form of a signal distribution unit, is hold in place by the at least one or by the plurality of fastening means.

In another embodiment of the present invention, the at least one fastening means or the plurality of fastening means are U-shaped so that the respective electronic module can be hold in place by a clamping mechanism.

In another embodiment of the present invention, a first and a second profile arrangement are provided and arranged next to each other and which extend in the longitudinal direction of the mobile communication antenna. The first and the second profile arrangement are arranged at least on a second side of the reflector arrangement which is opposite the first side. The wording "at least on a second side" would also allow that the respective profile arrangement could arranged partly on the first side of the reflector arrangement too. The first profile arrangement is connected with the reflector arrangement and/or with the first support section of the first support frame structure. The second profile arrangement is connected with the reflector arrangement and/or with the second support section of the first support frame structure. This increases the stability and allows that the thickness of the reflector arrangement can be reduced.

In another embodiment of the present invention, the first profile arrangement comprises a fastening area, wherein the fastening area comprises at least one first receiving groove or at least one first receiving projection which extends in the longitudinal direction of the mobile communication antenna and which is arranged in the first side of the reflector arrangement. The first supporting section of the first support frame structure is arranged on the at least one first receiving groove or receives the first receiving projection. The second profile arrangement comprises a fastening area, wherein the fastening area comprises at least one first receiving groove or at least one first receiving projection which extends in the longitudinal direction of the mobile communication antenna and which is arranged on the first side of the reflector arrangement. The second supporting section of the first support frame structure is arranged in the at least one first receiving groove or receives the first receiving projection. It is very beneficial that the first support frame structure can easily be arranged on the first and second profile arrangement.

In another embodiment of the present invention, the first support frame structure is attached in the respective first receiving groove and/or is attached to the first receiving projection of the first and second profile arrangement at a predetermined position or at an arbitrary position. Depending on the customer needs the first support frame structure can be mounted at the designated position.

In another embodiment of the present invention, at least a third profile arrangement is provided. The third profile arrangement is arranged at least on the second side of the reflector arrangement between the first and the second profile arrangement and extends in the longitudinal direction of the mobile communication antenna. The first profile arrangement is connected with the reflector arrangement and/or with the first support section of the first support frame structure and the first support section of the second support frame structure. The second profile arrangement is connected with the reflector arrangement and/or with the second support section of the first support frame structure and the second support section of the third support frame structure. The third profile arrangement is connected with the reflector arrangement and/or with the second support section of the second support frame structure and the first support section of the third support frame structure. This simplifies the fastening between the first, second and third support frame structures and the respective first, second and third profile arrangements.

The first, second and/or the third profile arrangements are preferably made of a metal piece and are more preferably made of a single metal piece and are more preferably made of an (metal or plastic) extrusion part.

In another embodiment of the present invention, the connecting element of the first support frame structure comprises a plurality of cross struts which are U-shaped and extend from the first support section to the second support section. The connecting element of the first support frame structure also comprises one or more longitudinal struts extending in the longitudinal direction of the mobile communication antenna. The one or more longitudinal struts connect cross struts to each other. The same could also be true for the second and/or third support frame structure. As a result, the first, second and/or third support frame structures preferably comprise lattice base structure.

In another embodiment of the present invention, the at least one longitudinal strut or the plurality of longitudinal struts are hollow, wherein a cable pull passes through them or wherein a coolant flows through them. It could also be, that the first and/or second support section of the first support frame structure comprises a hollow longitudinal strut through which a cable pull is passed through which coolant flows. The same could also be true for the second and/or third support frame structure.

In another embodiment of the present invention, spacers are provided which are arranged at the connecting element of the first support frame structure and point away from the reflector arrangement and are configured to keep a radome or radome foil at a distance from the dual-polarized radiators.

In another embodiment of the present invention, the first support frame structure comprises a plurality of dual-polarized radiators which are arranged in m columns, with m≥1, 2, 3, 4, wherein the dual-polarized radiators in the m columns are spaced apart from one another in the longitudinal direction of the mobile communication antenna. The same could also be true for the second and/or third support frame structure.

In another embodiment of the present invention, each dual-polarized radiator of the first support frame structure has a first connector for a first polarization and a second connector for a second polarization. The respective first connectors of the dual-polarized radiators of the column are coupled to first terminals of a signal distribution unit for mobile radio signal transmission and the respective second connectors of the dual-polarized radiators of the column are coupled to second terminals of the signal distribution unit for mobile radio signal transmission. The wording "coupled" is understood in such a way that either a galvanic connection or a capacitive coupling between the respective connectors and the respective terminals as possible. The capacitive coupling is preferred, because then no soldered joints have to be used. More preferably, the respective dual-polarized radiators each column are connected to the respective signal distribution units solder free by using a capacitive coupling. The same could also be true for the dual-polarized radiators attached to the second and/or third support frame structure. Preferably one signal distribution unit is used for each column of dual-polarized radiators in the respective first, second and/or third support frame structure.

In another embodiment of the present invention, the electronic module, especially the respective signal distribution unit extends in the longitudinal direction of the mobile communication antenna and comprises a dual-signal distributor, wherein said one dual-signal distributor comprises said first and second terminals. The respective signal distribution unit could also comprise two single-signal distributors (=mono-signal distributors) housed in separate enclosures, wherein the first single-signal distributor only comprises the first terminal and wherein the second single-signal distributor only comprises the second terminals.

In another embodiment of the present invention the dual-signal distributor comprises two housing halves. A partition wall is arranged between them, so that two separate chambers are formed. A first phase shifter for mobile communication signals of the first polarization is arranged in the first chamber. The plurality of ports of the first phase shifter is connected via the plurality of first terminals of the dual-signal distributor to the plurality of first connectors of the dual-polarized radiators in the same column. Furthermore, a second phase shifter for mobile communication signals of a second polarization is arranged in the second chamber. The plurality of ports of the second phase shifter is connected via the plurality of second terminals of the dual-signal distributor to the plurality of second connectors of the dual-polarized radiators in the same column.

The first single-signal distributor comprises two housing halves. On the one hand, a phase shifter for mobile communication signals of a first polarization is arranged between the two housing halves, wherein the plurality of ports of the phase shifter is connected via the plurality of first terminals of the first single-signal distributor to the plurality of first connectors of the dual-polarized radiators of the same column. On the other hand, partitions are arranged between the housing halves, thereby forming at least three separate chambers. A first phase shifter for mobile communication signals of a first polarization in a first frequency range (for example a first mobile communication band) is arranged in the first chamber. A second phase shifter for mobile communication signals of a first polarization and a second frequency range (for example a second mobile communication band) is arranged in the second chamber. A printed circuit board arrangement or a sheet metal part arrangement or a coated plastic material arrangement is arranged in the third chamber. The printed circuit board arrangement or the sheet metal part arrangement or the coated plastic material arrangement comprises a circuit structure configured to connect a respective one of the plurality of ports of the first phase shifter and a respective one of the plurality of ports of the second phase shifter to each other and to a respective first terminal of the first single-signal distributor, wherein the plurality of first terminals of the first single-signal distributor are connected to the plurality of first connectors of the dual-polarized radiators of the same column. The printed circuit board arrangement or the sheet metal part arrangement or the coated plastic material arrangement could also comprise a filter network and/or a frequency split.

The second single-signal distributor comprises two housing halves. On the one hand, a phase shifter for mobile communication signals of a second polarization is arranged between the two housing halves, wherein the plurality of ports of the phase shifter is connected via the plurality of second terminals of the second single-signal distributor to the plurality of second connectors of the dual-polarized radiators of the same column. On the other hand, partitions are arranged between the housing halves, thereby forming at least three separate chambers. A first phase shifter for mobile communication signals of a second polarization in a first frequency range (for example a first mobile communication band) is arranged in the first chamber. A second phase shifter for mobile communication signals of a second polarization and a second frequency range (for example a second mobile communication band) is arranged in the second chamber. A printed circuit board arrangement or a sheet metal part arrangement or a coated plastic material arrangement is arranged in the third chamber. The printed circuit board arrangement or the sheet metal part arrangement or the coated plastic material arrangement comprises a circuit structure configured to connect a respective one of the plurality of ports of the first phase shifter and a respective one of the plurality of ports of the second phase shifter to each other and to a respective second terminal of the second single-signal distributor, wherein the plurality of second terminals of the second single-signal distributor are connected to the plurality of second connectors of the dual-polarized radiators of the same column. The printed circuit board arrangement or the sheet metal part arrangement or the coated plastic material arrangement could also comprise a filter network and/or a frequency split.

In another embodiment of the present invention, the first support frame structure is a single piece, wherein the plurality of dual-polarized radiators is arranged in m columns, with m≥1, 2, 3, 4. Alternatively, the first support frame structure is subdivided into several separate first support frame structure modules, which are arranged adjacent to each other in the longitudinal direction of the mobile communication antenna, whereby on each support frame structure module a dual-polarized radiator arranged in each of the m columns, with m≥1, 2, 3, 4. It could also be that on each support frame structure module several dual-polarized radiators are spaced apart from one another in the longitudinal direction of the mobile communication antenna in the m columns, with m≥1, 2, 3, 4. The same could also be true for the second and/or third support frame structure.

The respective support frame structure modules could also be jointed together, for example by using a plug connection which is preferably established in the respective first and/or second support section.

In another embodiment of the present invention, the connecting element comprises a first and the second part perpendicular or predominantly perpendicular to the reflector arrangement. The wording "predominantly perpendicular" is understood in such a way that an angle between the first and the second part towards the reflector arrangement is larger than 45° and smaller than 135°. At least one fastening means is attached to the first and/or second support section and/or to the first and/or second part. The fastening means is configured to provide a releasable mechanical connection between the first support frame structure and another (corresponding) fastening means which is located at the reflector arrangement and/or at a first and/or second profile arrangement and/or at a second and/or third support frame structure and/or at a signal distribution unit. The same could also be true for the second and/or the third support frame structure.

In another embodiment of the present invention, dual-polarized high band radiators are arranged on the first side of at least one part of the reflector arrangement. The dual-polarized high band radiators are at least partially or completely arranged within the first receiving room of the first support frame structure.

In another embodiment of the present invention, this part of the reflector arrangement, on which the dual-polarized high band radiators are arranged is configured to be pulled out of the mobile communication antenna so that it can be replaced even in the mounted state of the mobile communication antenna.

In another embodiment of the present invention, active components (for example power amplifiers, low noise amplifiers) are arranged on the second side of the part of the reflector arrangement, on which the dual-polarized high band radiators are arranged.

The low band preferably comprises a frequency range of 600 MHz or 650 MHz or 698 MHz to 960 MHz.

The mid-band preferably comprises a frequency range of 1427 MHZ to 2700 MHz or 1695 MHZ to 2700 MHZ.

The high band preferably comprises a frequency range of 3300 MHz to 3800 MHz or 3300 MHZ to 4200 MHz or 4500 MHz to 5000 MHZ, 6000 MHz or 7000 MHz or 8000 MHz.

BRIEF DESCRIPTION OF THE DRAWINGS

Different embodiments of the invention will be described in the following, by way of example and with reference to the drawings. The same elements are provided with the same reference signs. The figures show in detail.

Figure 2A:
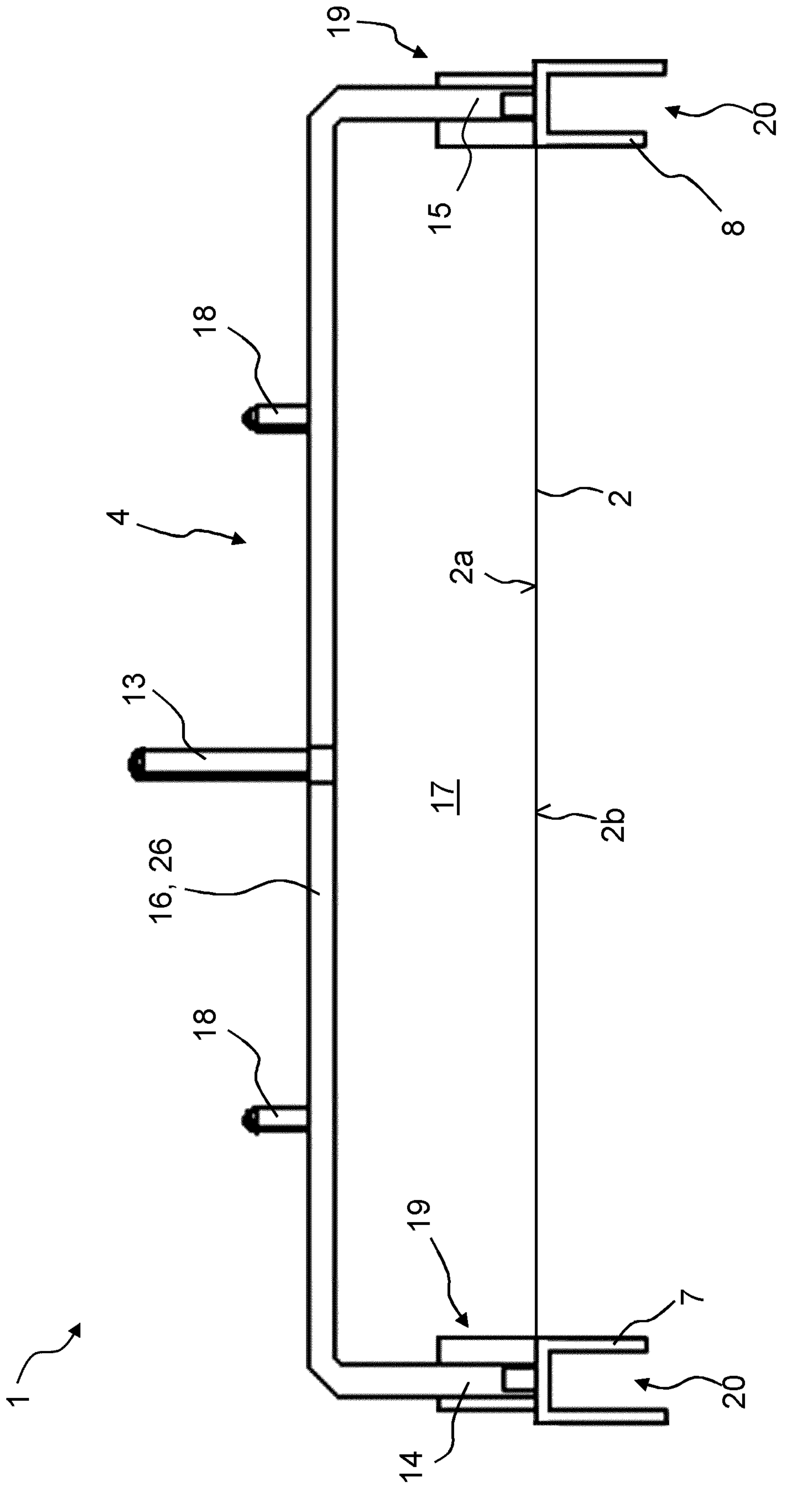
FIGS. 2A, 2B, 2C, 2D.
Figure 2B:
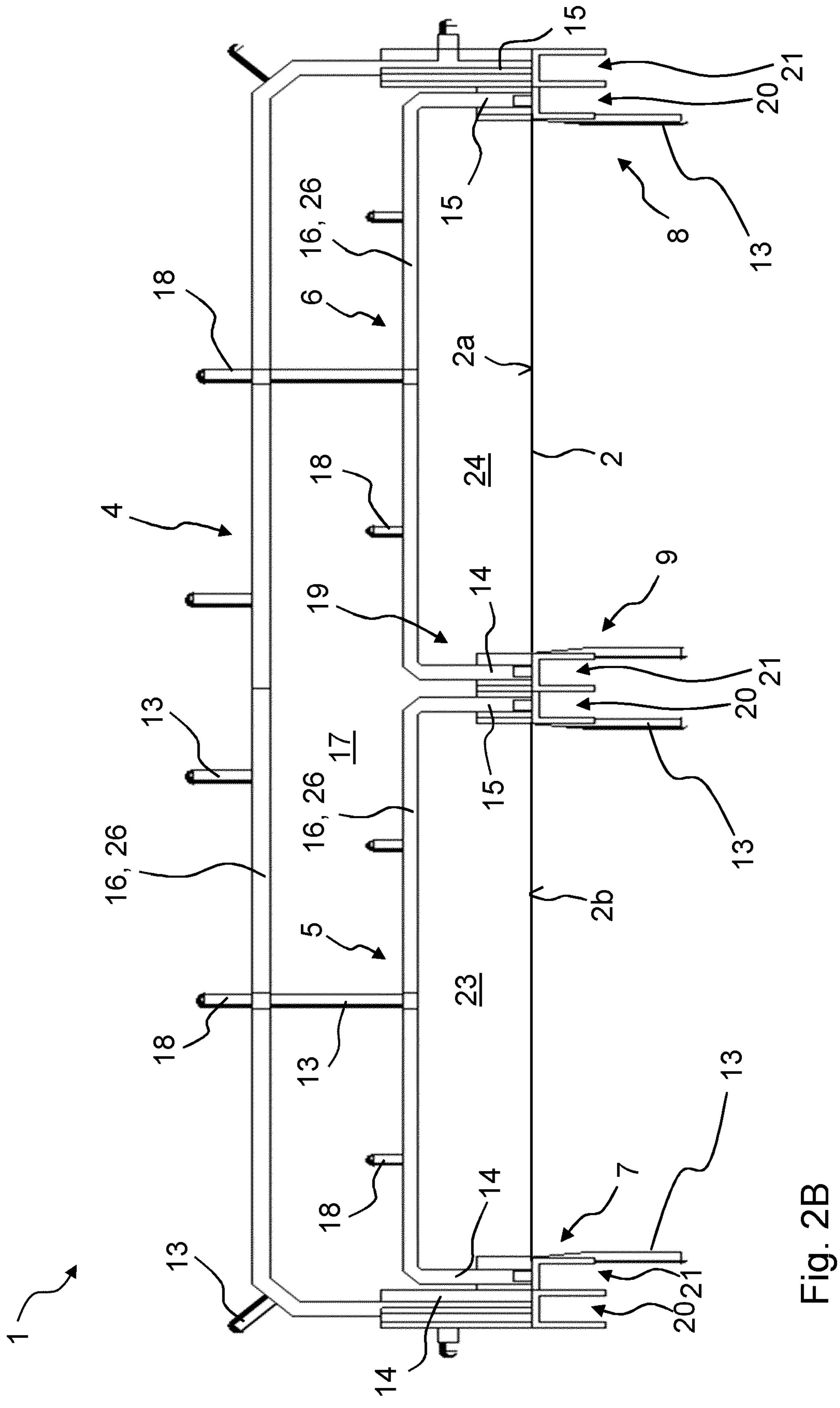
Figure 2C:
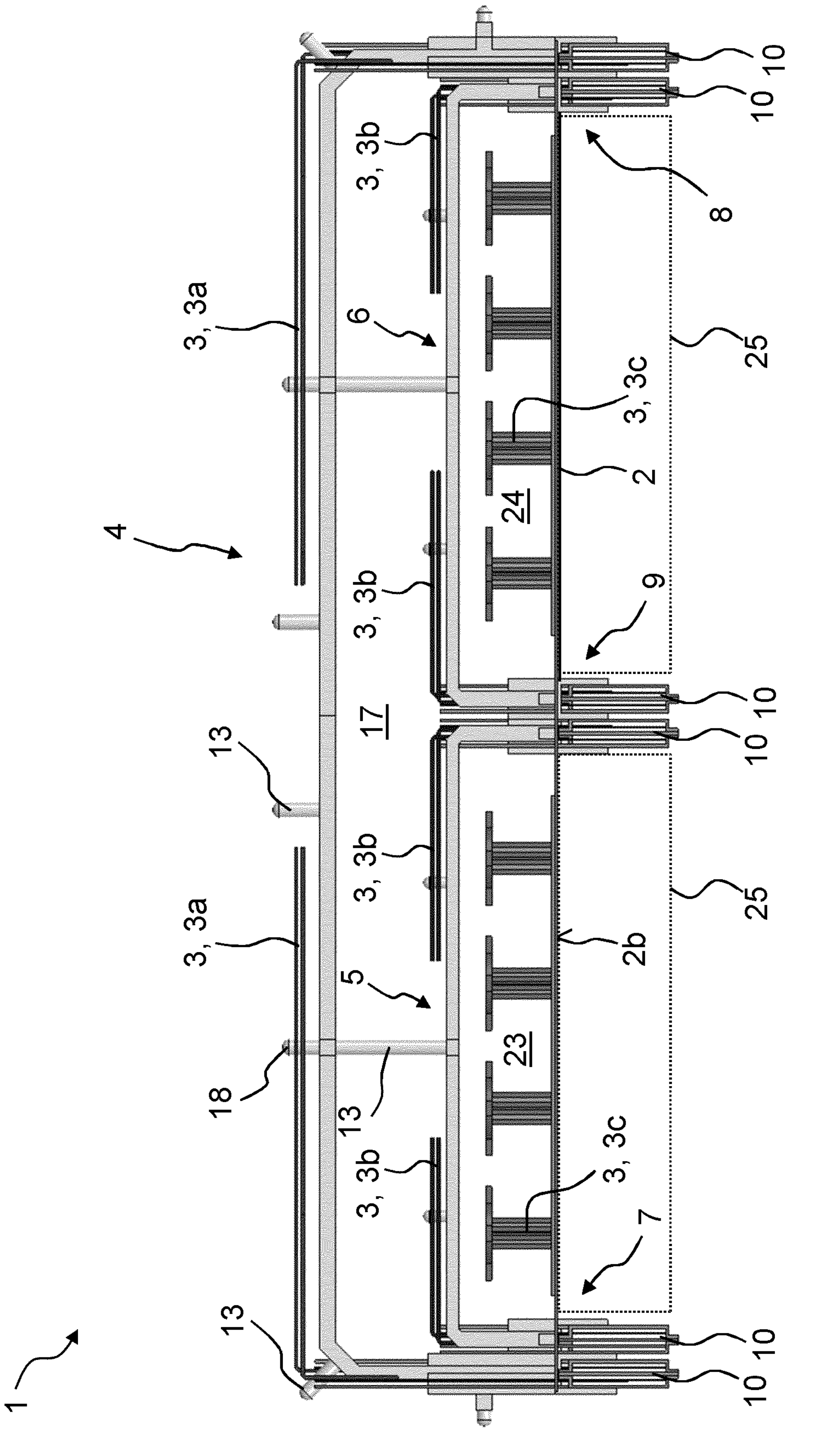
Figure 2D:
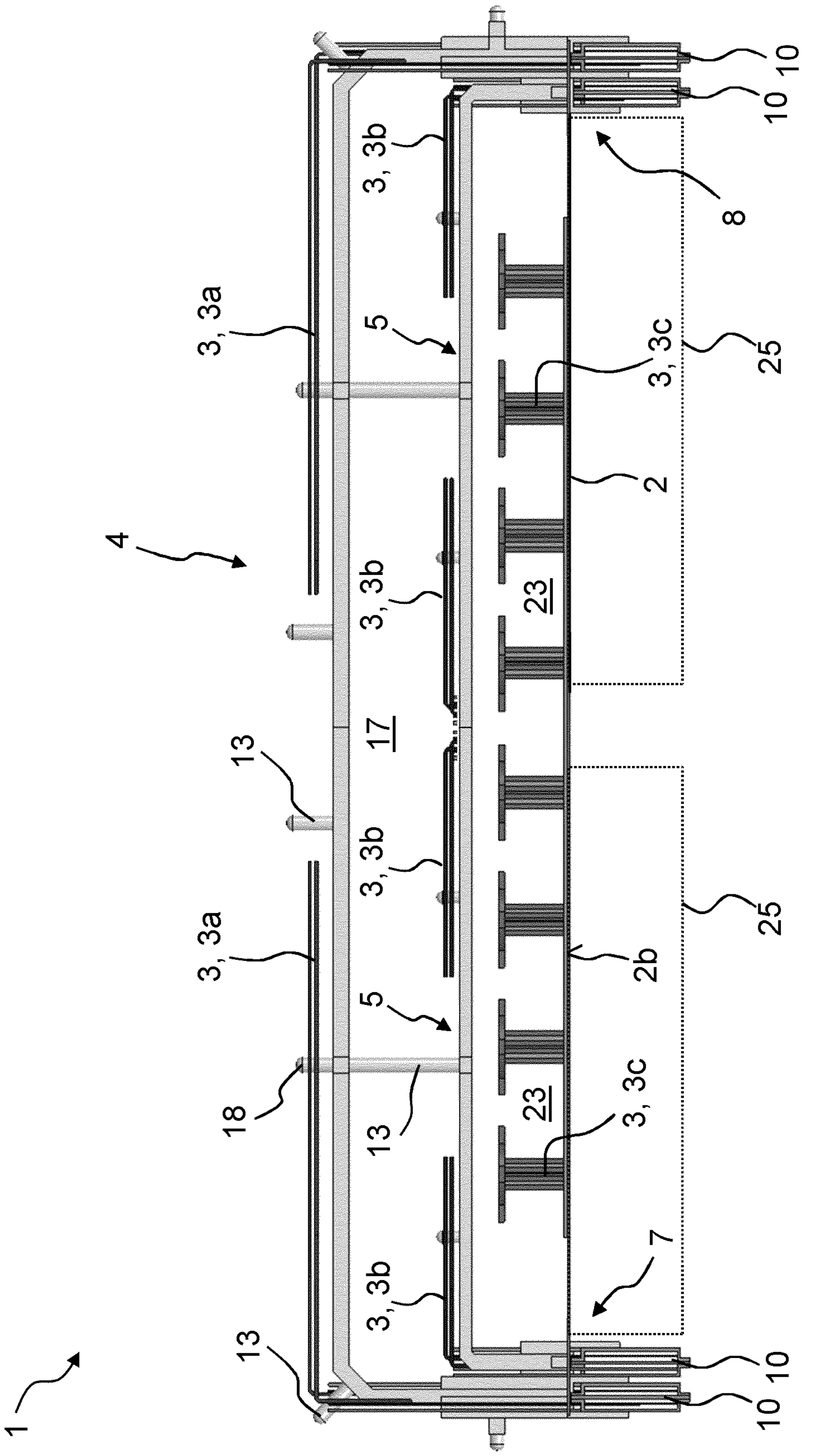
Figure 2F:
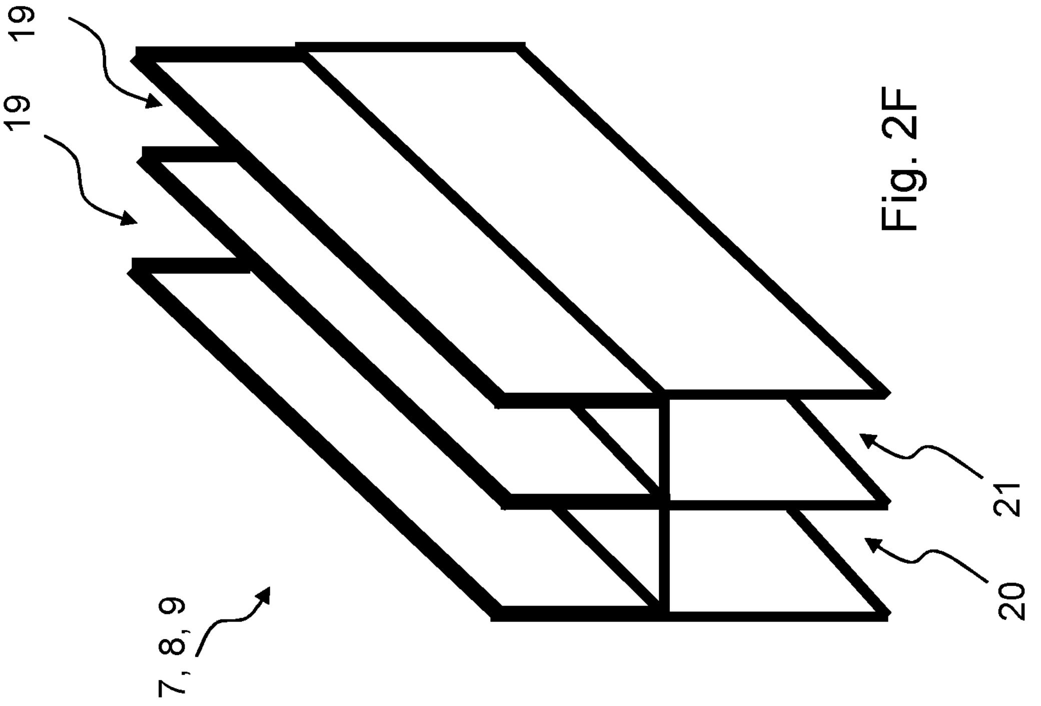
Figure 2E:
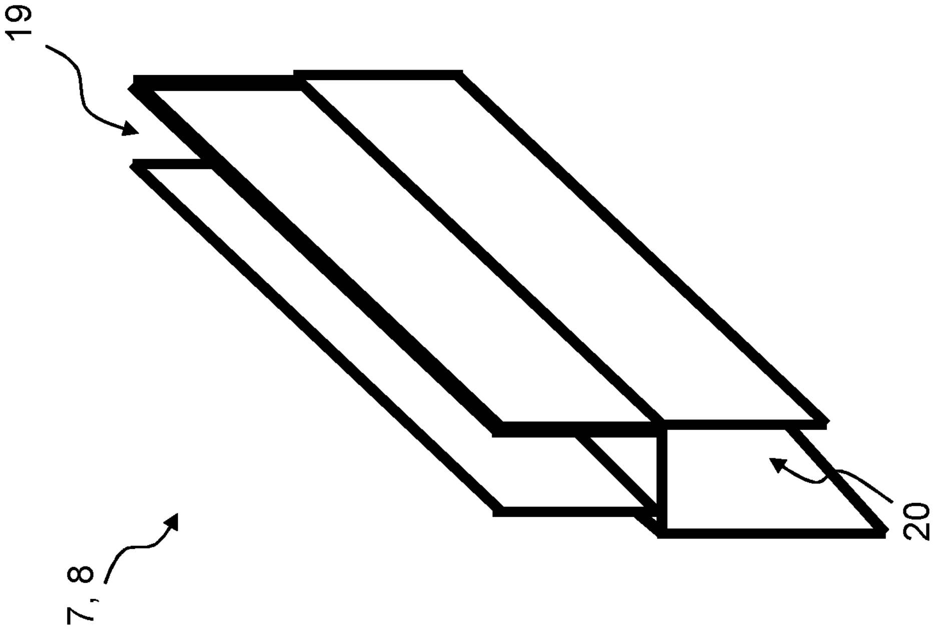
Figure 3A:
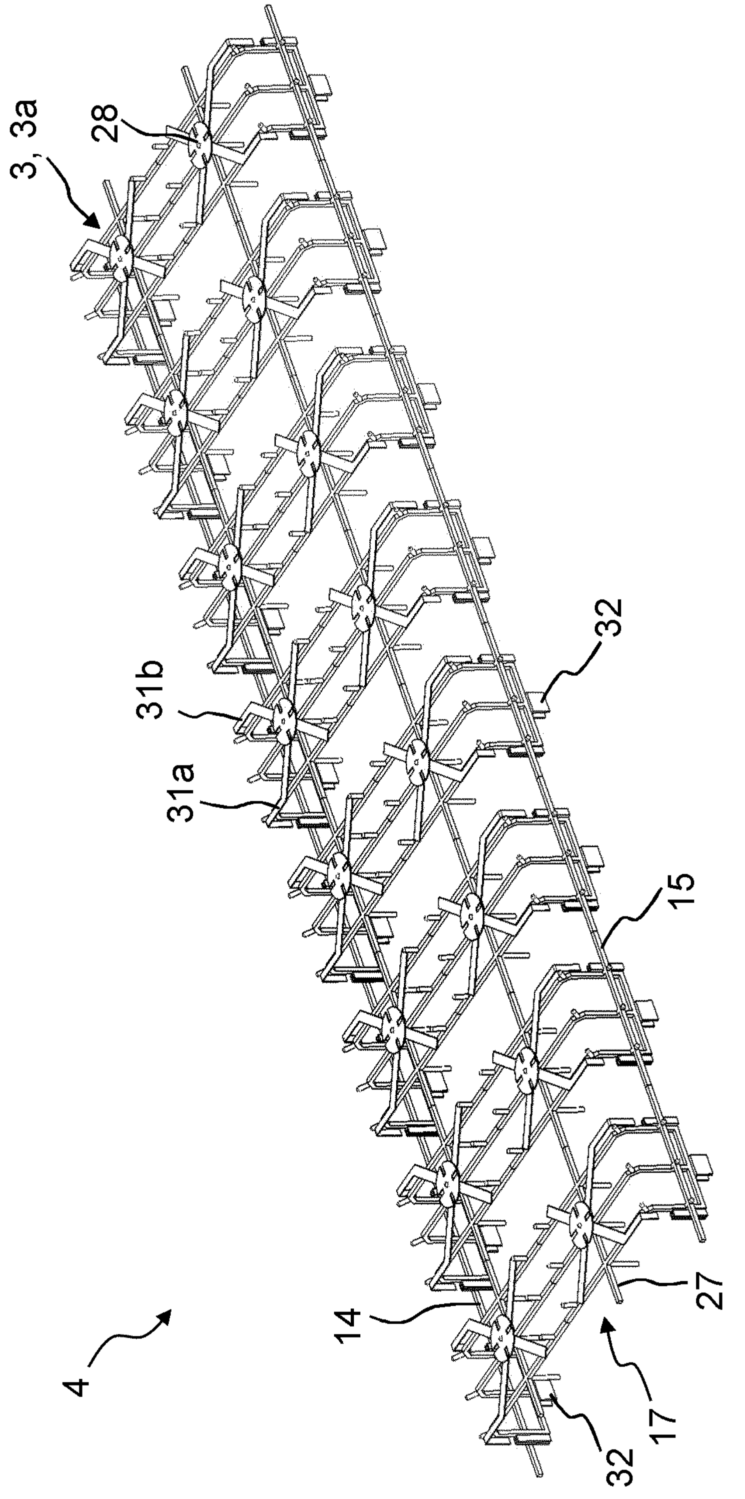
Figure 3B:
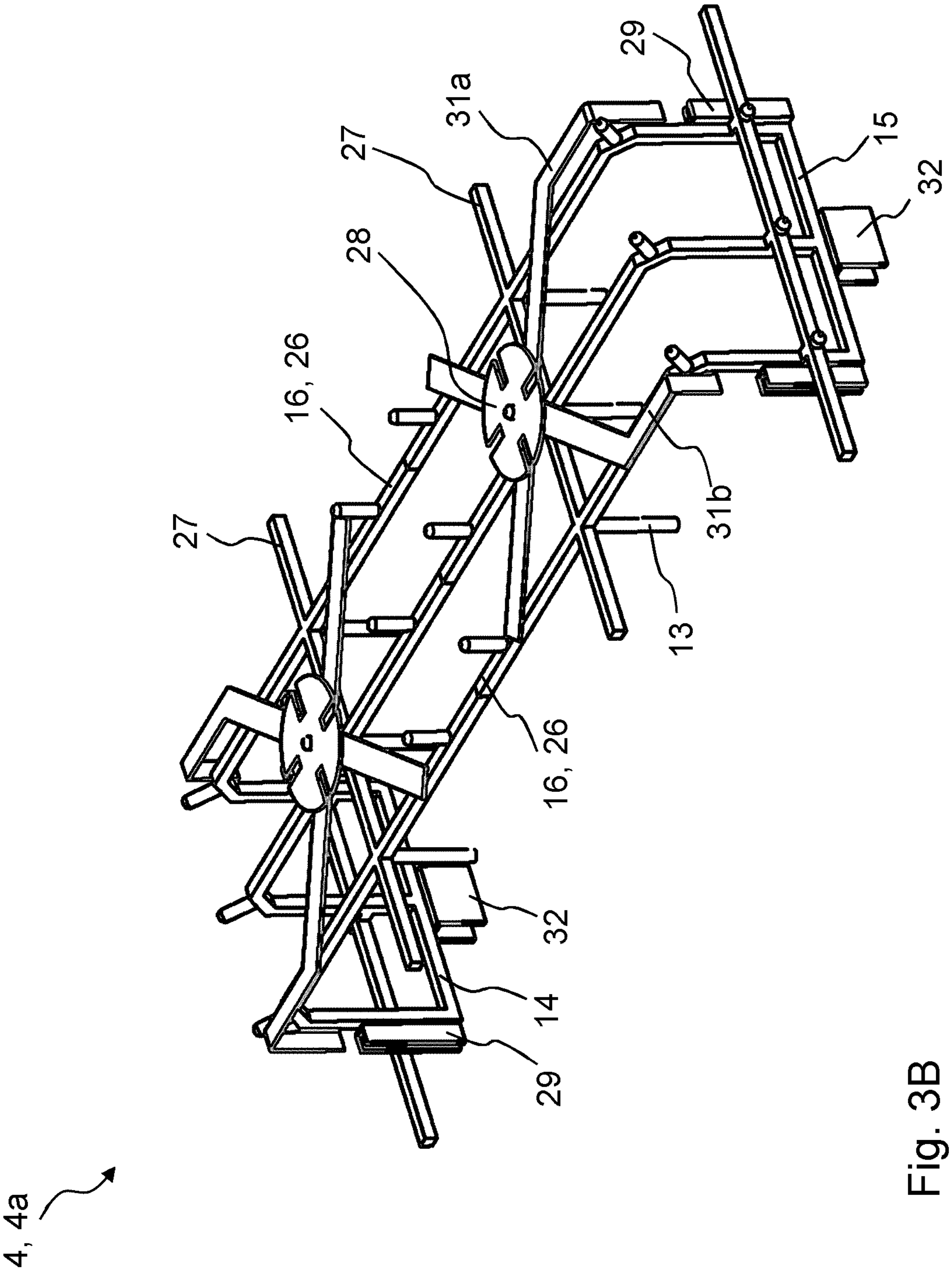
Figure 4A:
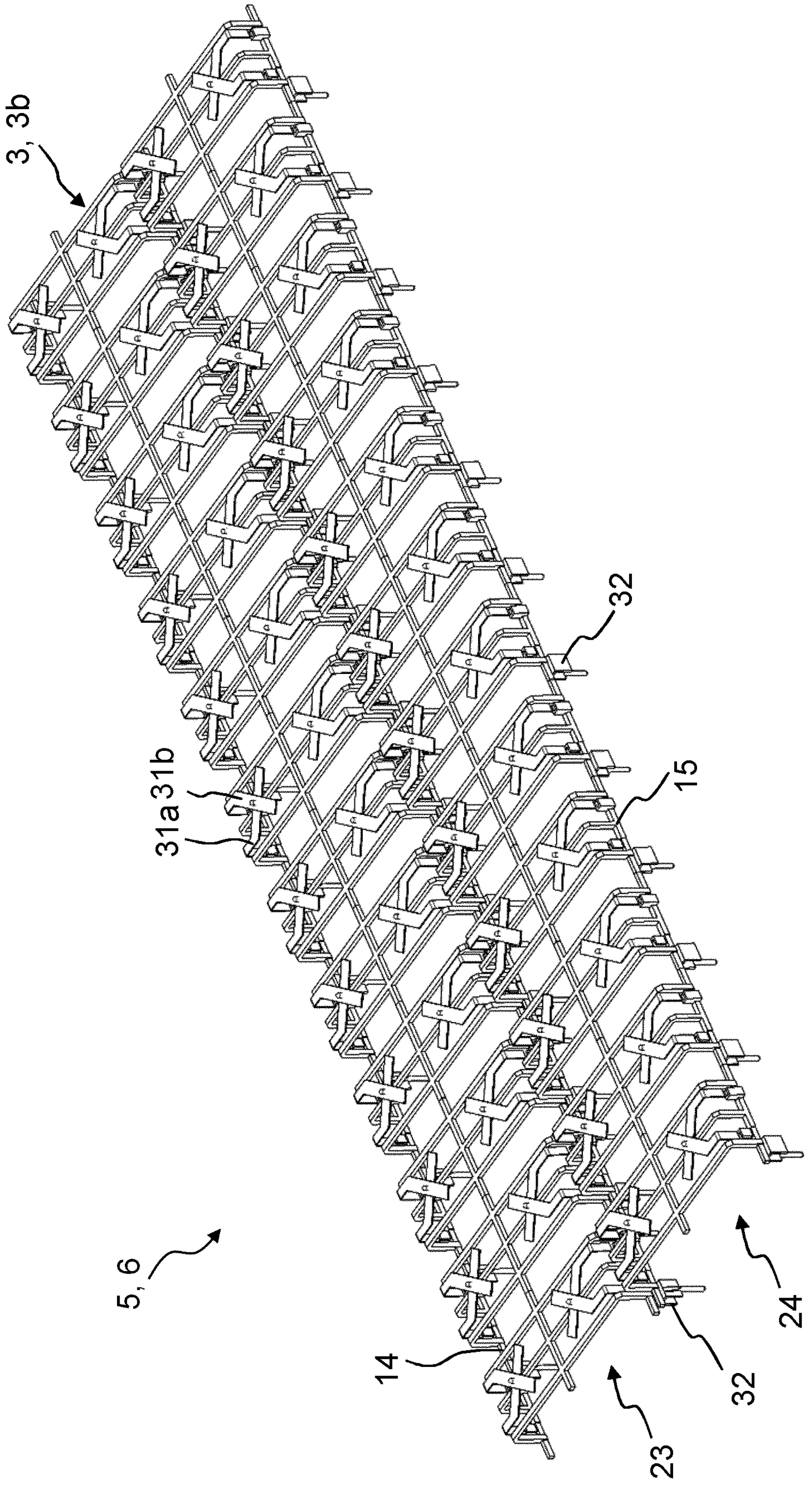
Figure 4B:
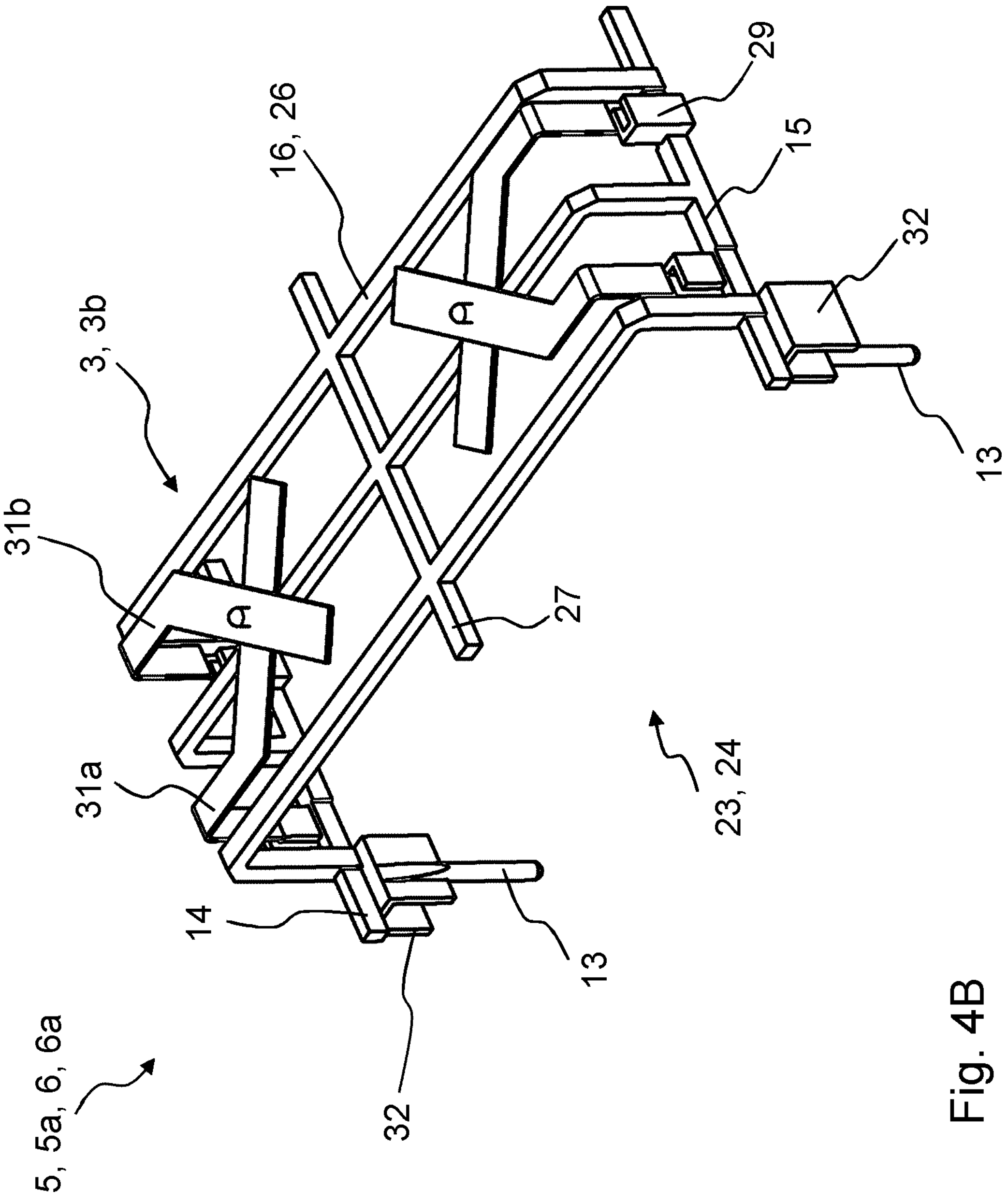
Figure 5:
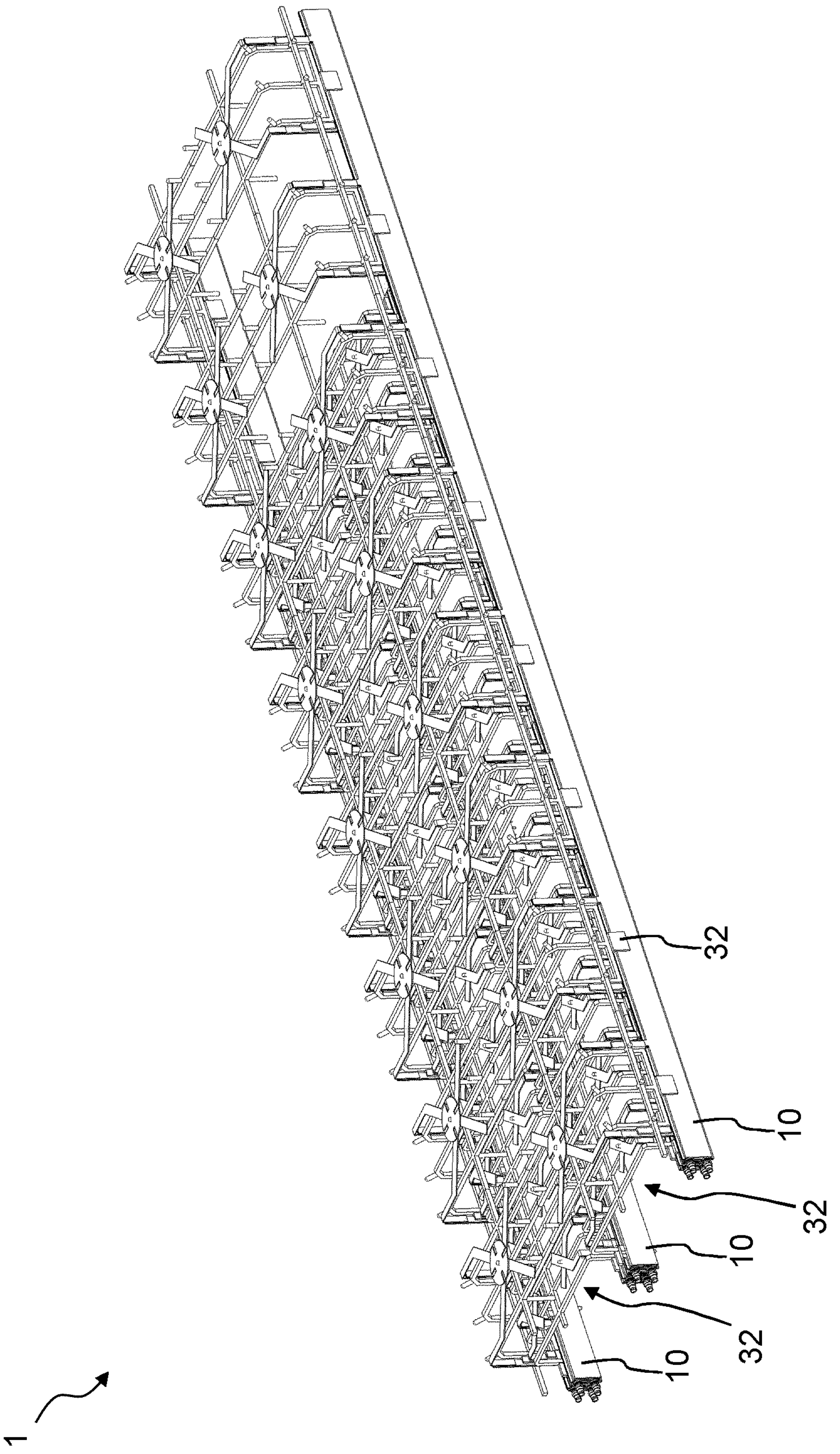
Figure 6:
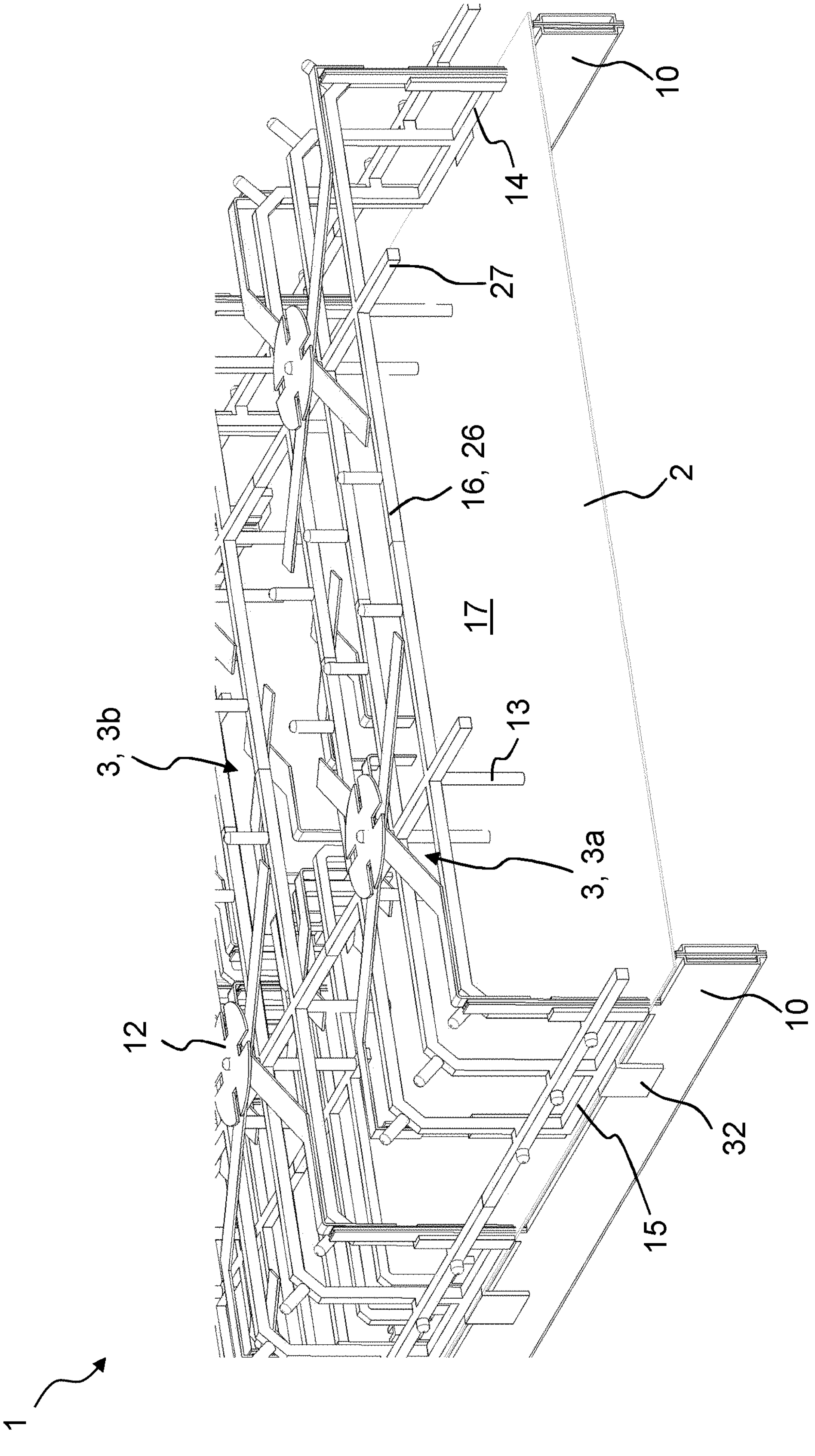
Figure 7B:
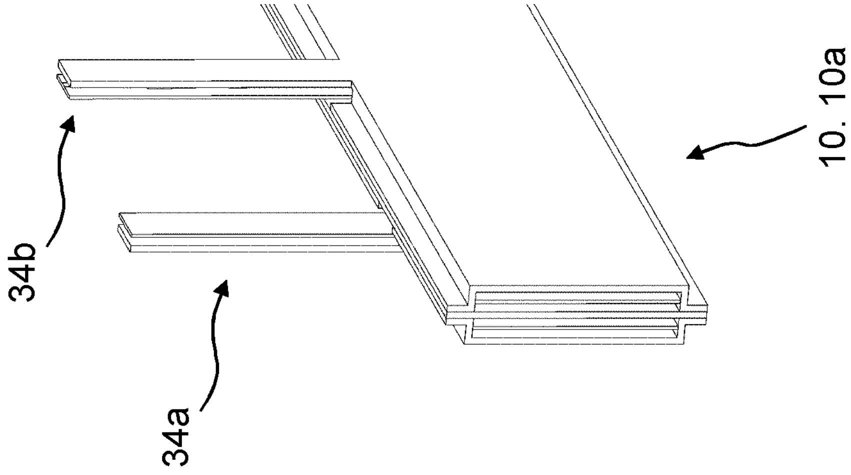
Figure 7A:
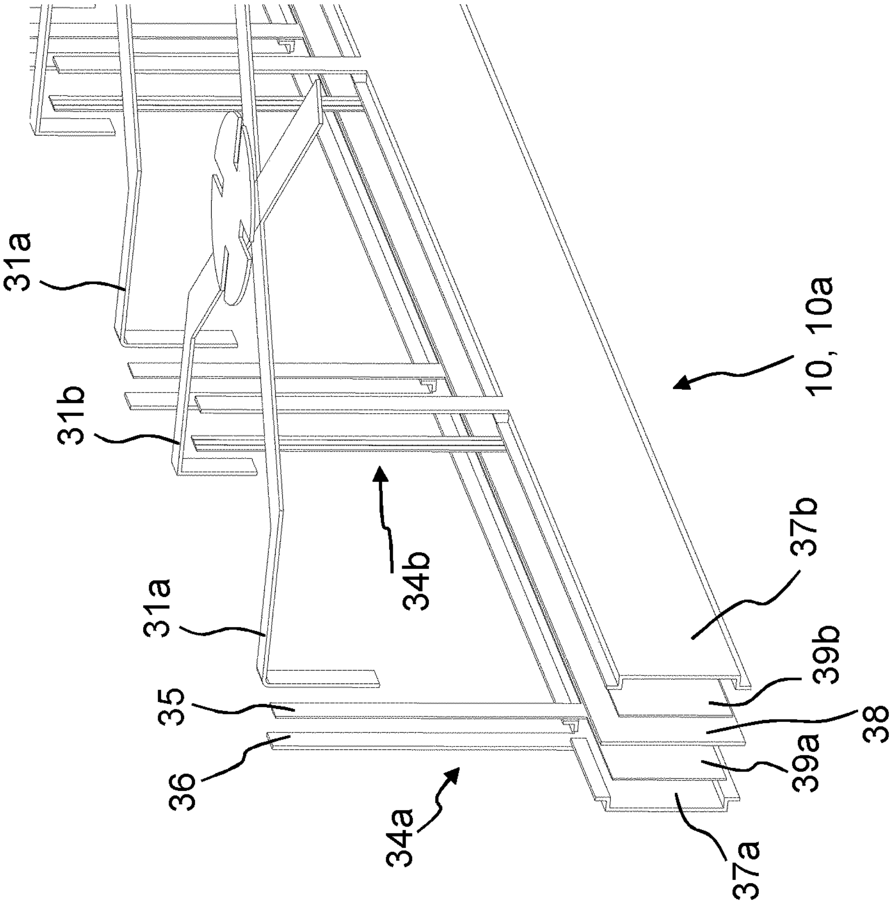
Figure 7D:
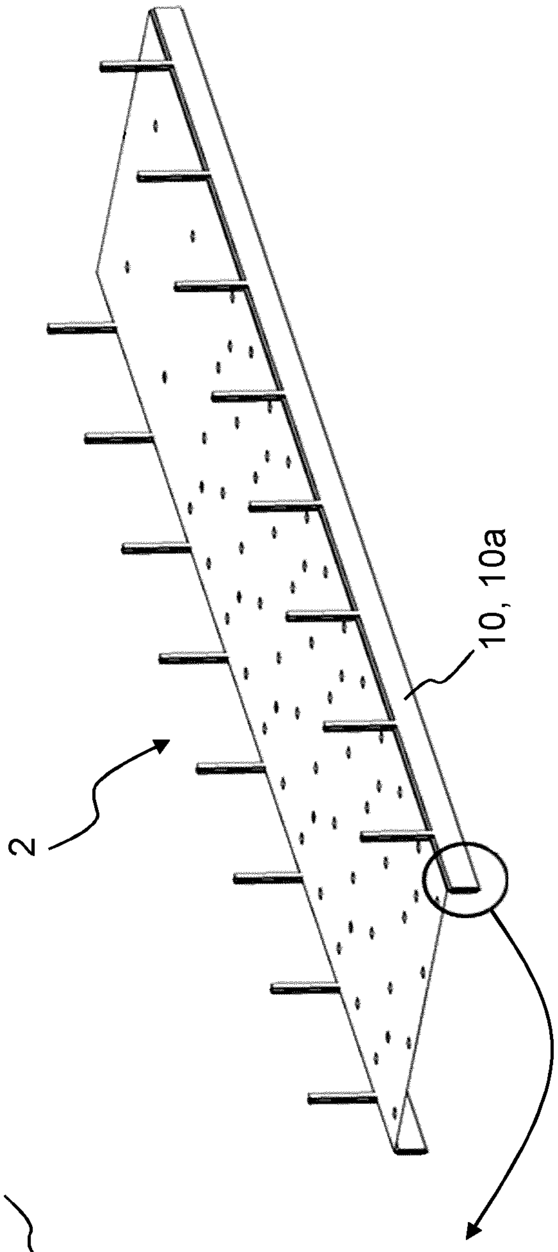
Figure 7C:
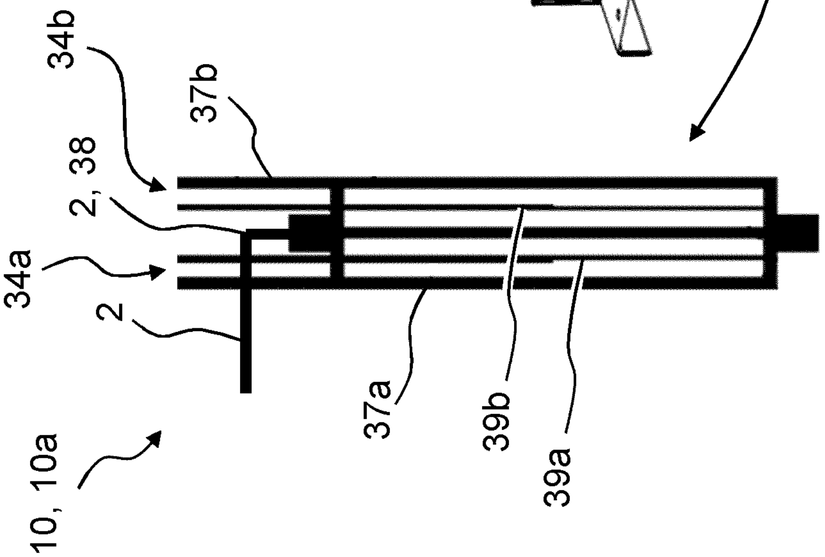
Figure 8B:
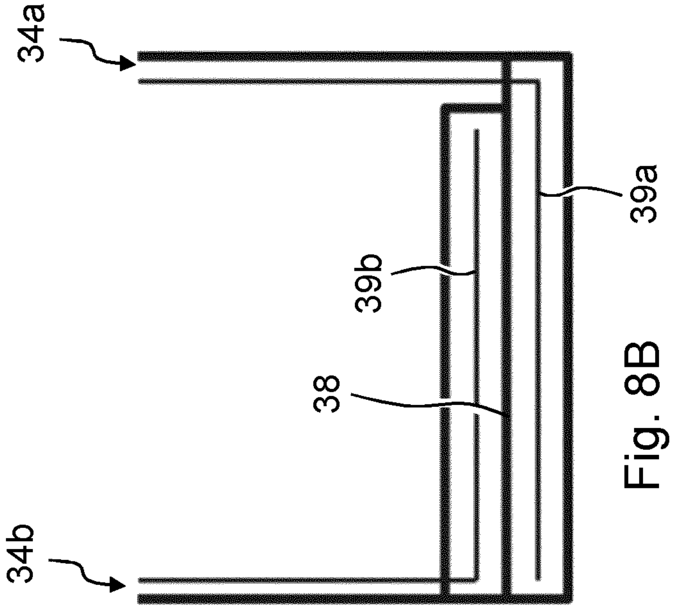
Figure 8A:
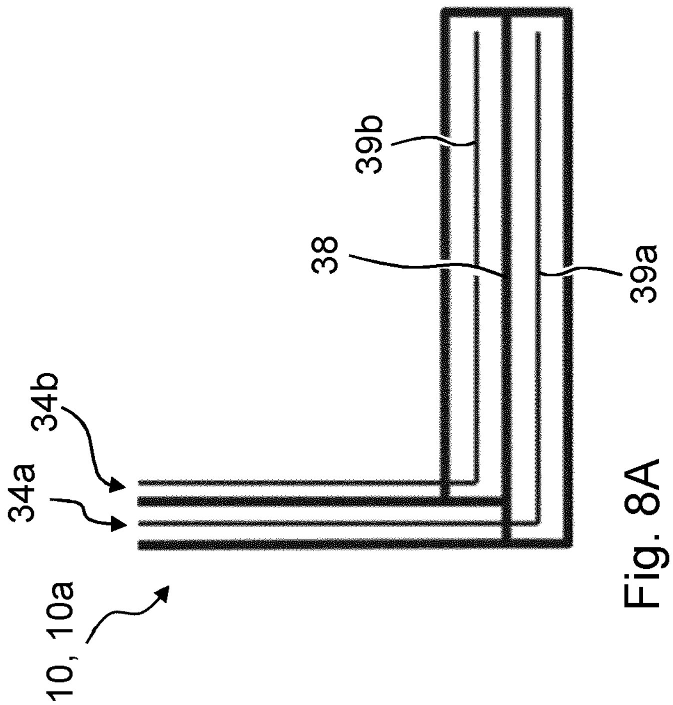
Figure 9:
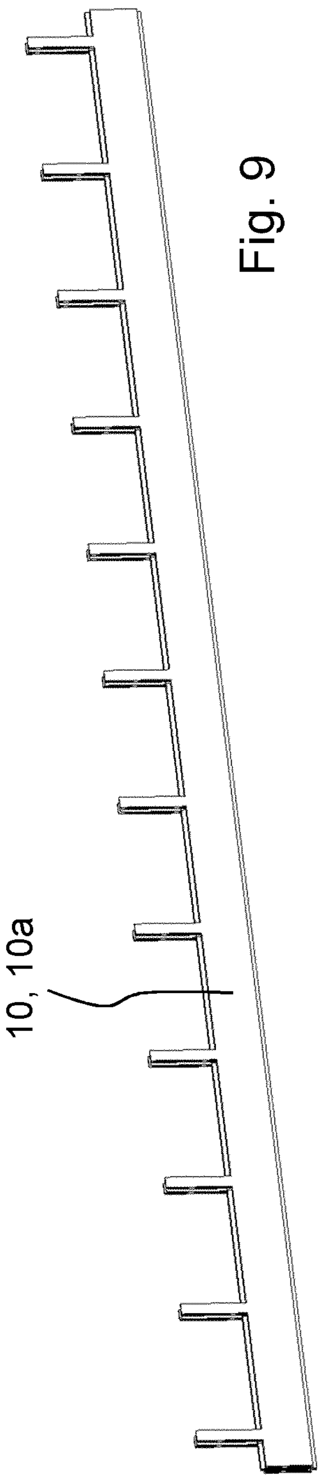
Figure 11:
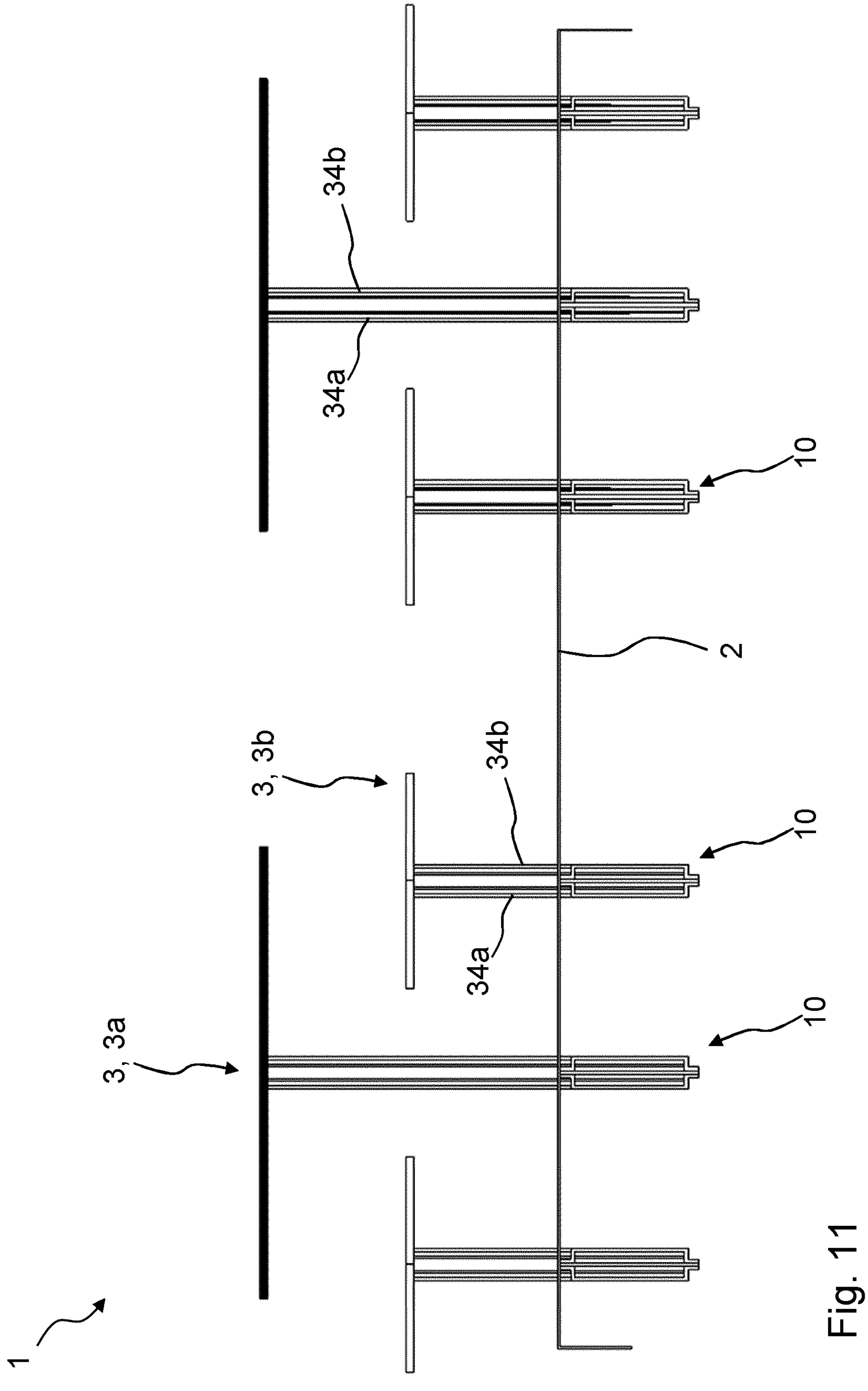
Figure 12C:
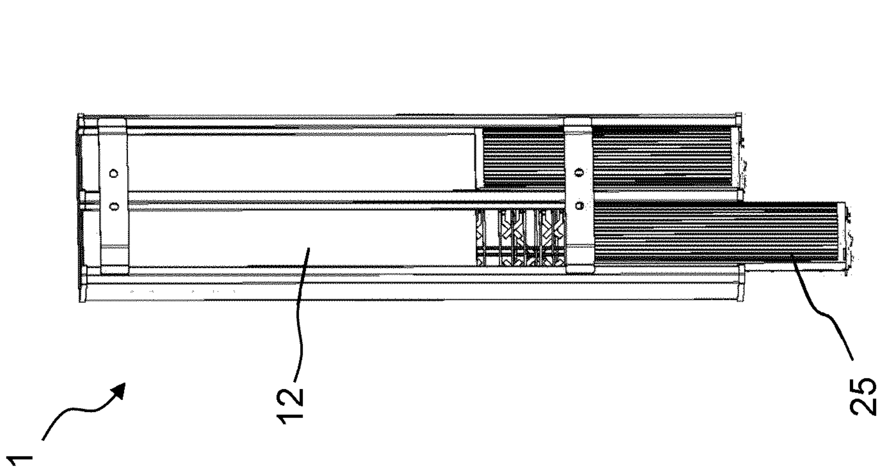
Figure 12B:
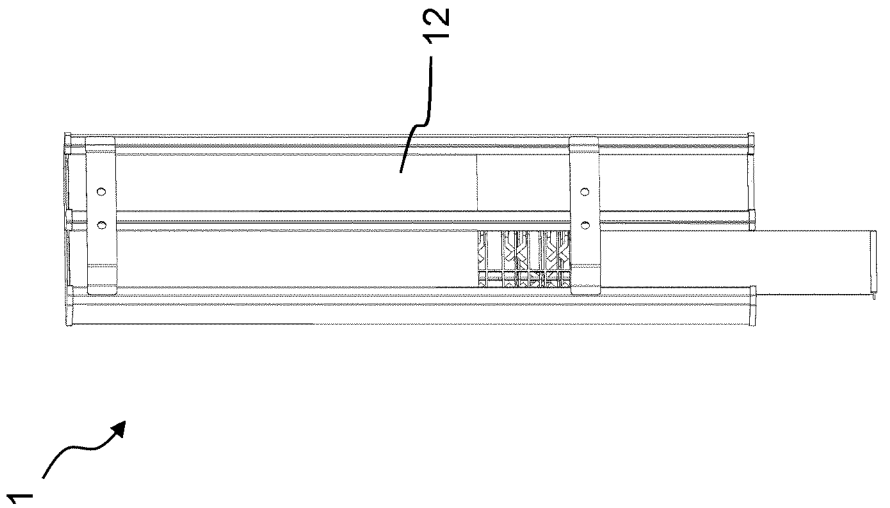
Figure 12A:
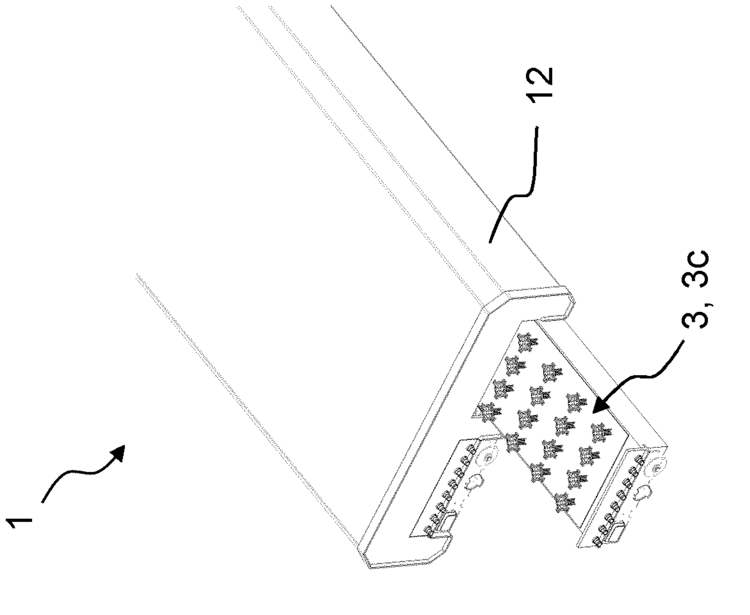

various cross sections through a first, second and third support frame structure;

FIGS. 2E, 2F: various embodiments of a profile arrangement;

FIGS. 3A, 3B: three dimensional views of the first support frame structure;

FIGS. 4A, 4B: three dimensional views of the second and third support frame structures;

FIG. 5: three dimensional views of the first, second and third support frame structures and of first, second and third profile arrangements;

FIG. 6: a three dimensional view of the connection between the first support frame structure and the reflector arrangement using two signal distribution units;

FIG. 7A, 7B, 7C: three dimensional views of a signal distribution unit in form of a dual-signal distributor;

FIG. 7D: a three dimensional view of the attachment of the signal distribution units of FIGS. 7A, 7B 7C to a reflector arrangement;

FIG. 8A, 8B: cross sections through other embodiments of a signal distribution unit in form of a dual-signal distributor;

FIG. 9: a three dimensional view of the signal distribution unit of FIGS. 7A, 7B 7C;

FIG. 10A, 10B, 10C, 10D, 10E: various views of a signal distribution units in form of a single-signal distributor;

FIG. 11: a cross section through the mobile communication antenna indi-cation that the signal distribution unit is directly connected to a dual-polarized radiator; and FIG. 12A, 12B, 12C: three dimensional views mobile communication antenna indicating that a part of the reflector arrangement together with dual-polarized high-band radiators can be exchanged on site.

DETAILED DESCRIPTION

Figure 1:
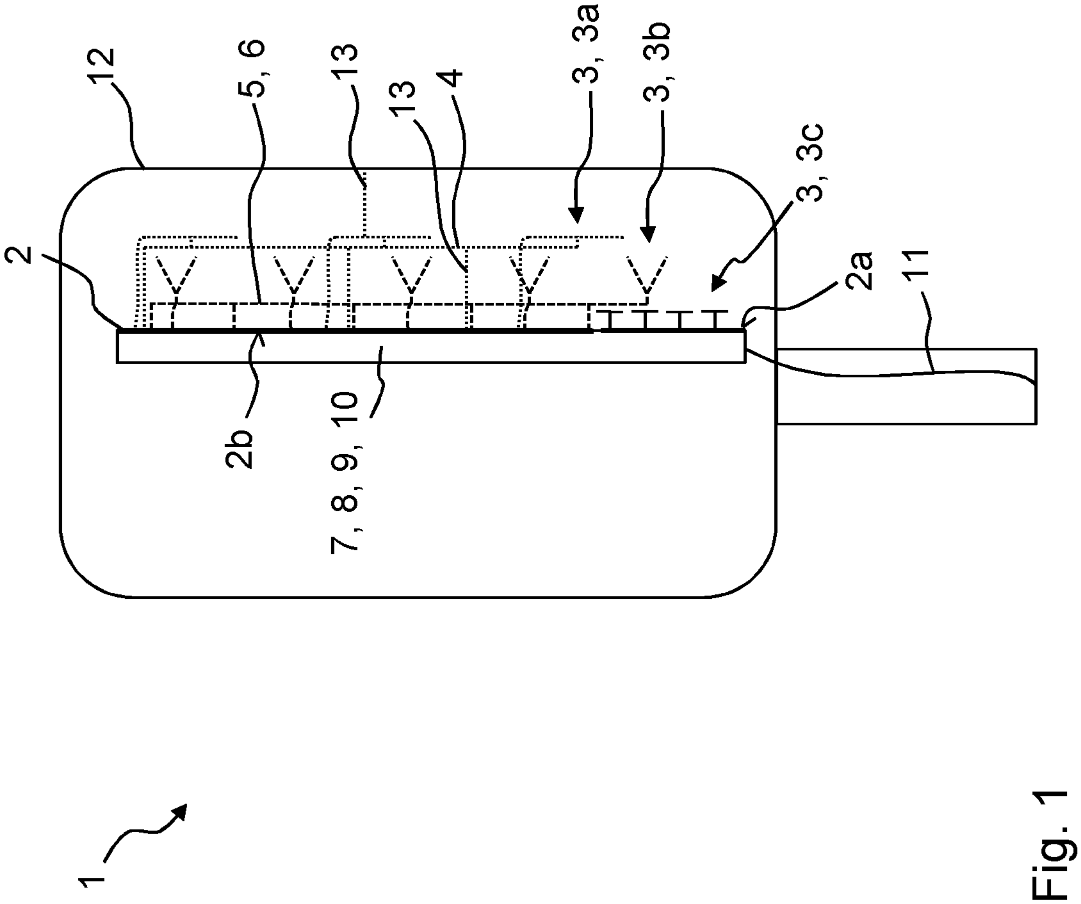
FIG. 1: a mobile communication antenna according to the present invention.

FIG. 1 shows an embodiment of the mobile communication antenna 1 according to the present invention. The mobile communication antenna 1 is used to com-municate with a plurality of mobile devices like cell phones. The mobile communication antenna 1 is preferably mounted on a mast. The mobile communication antenna 1 comprises a reflector arrangement 2. Furthermore, a plurality of dual-polarized radiators 3 is provided. There could be different types of dual-polarized radiators 3. For example cross dipoles, vector dipoles, dipole squares can be used among others. Furthermore, the dual-polarized radiators 3 are configured to transmit and receive mobile communication signals in two polariza-tions. For example, a ±45° polarization, a horizontal/vertical polarization, an elliptic polarization or a circular polarization can be used.

The dual-polarized radiators 3 are configured to operate as low band dual-polarized radiators 3*a*, mid band dual-polarized radiators 3*b* or high band dual-polarized radiators 3*c*. Within FIG. 1, there are low band, mid band and high band dual-polarized radiators 3*a*, 3*b*, 3*c* shown. The dual-polarized high band radiators 3*c* are arranged closer to the reflector arrangement 2 than the dual-polarized mid band radiators 3*b* and the dual-polarized low band radiators 3*a*. The dual-polarized mid band radiators 3*b* are arranged closer to the reflector arrangement 2 than the dual-polarized low band radiators 3*a*.

The radiators 3 are arranged on a first side 2*a* of the reflector arrangement 2.

The dual-polarized low band radiators 3*a* are kept in position by using a first support frame structure 4. The dual-polarized mid band radiators 3*b* are kept in position by using second and/or third support frame structures 5, 6.

The respective first, second, third support frame structure 4, 5, 6 preferably comprise a dielectric material like plastic or consist of a dielectric material like plastic.

The respective first, second, third support frame structure 4, 5, 6 extend in the longitudinal direction of the mobile communication antenna 1. As will be explained below, it could be possible that only a first support frame structure 4 for the dual-polarized low band radiators 3*a* is used. It could also be that only first and second support frame structures 4, 5 for the dual-polarized mid band radiators 3*b* are used. It could also be that the first support frame structure 4 is used for the dual-polarized low band radiators 3*a* and the second and third support frame structures 5, 6 are used for the dual-polarized mid band radiators 3*b*. In addition or alternatively, the dual-polarized high band radiators 3*c* can be added depending on the customer needs. As such, the first, second and third support frame structure 4, 5, 6 are modular and can be used within the mobile communication antenna 1 alone or in combination with the other support frame structures.

The part of the reflector arrangement 3 on which the dual-polarized high band radiators 3*c* are mounted is preferably exchangeable while the mobile communication antenna 1 is still mounted on the mast.

On the second side 2*b* of the reflector arrangement 2 there is preferably a first, second and/or third profile arrangement 7, 8, 9 arranged. In addition or alternatively, there could also be a signal distribution unit 10 arranged. Power amplifiers and/or low noise amplifiers could also be arranged on the second side 2*b* of the reflector arrangement 2. By using a feeder cable 11, the plurality of dual-polarized radiators 3 are connected to a base station (not shown).

A radome 12 or a radome foil encloses the components arranged within. Spacers 13 which are preferably arranged on the first support frame structure 4 ensure that the desired distance between the radome 12 or the radome foil and the dual-polarized radiators 2 is maintained. Those spacers 13 are preferably arranged not only at the first side 2*a* of the reflector arrangement 2 but also on the second side 2*b* of the reflector arrangement 2. More preferably, the spacers 13 have a flat or rounded end so that they do not damage the radome 12 or the radome foil.

FIGS. 2A, 2B, 2C and 2D show various cross sections through the mobile communication antenna 1. Within FIG. 2A only a first support frame structure 4 is provided. The first support frame structure 4 comprises a first support section 14 and a second support section 15. The first support section 14 and a second support section 15 are arranged side by side and extend in the longitudinal direction of the mobile communication antenna 1. Furthermore, the first support frame structure 4 comprises a connecting element 16 which connects the first and the second support sections 14, 15 in a bridge-like manner thereby spanning a first receiving room 17. The first support frame structure 4 is preferably U-shaped in its cross section view.

Furthermore, spacers 13 are arranged preferably on top of the connecting element 16 ensuring that the radome 12 stays contact free to the dual-polarized radiators 3.

In addition, the connecting element 16 comprises a plurality of mounting sections 18, wherein dual-polarized radiators 3, especially dual-polarized low band radiators 3*a* are mounted on at least one or all of the mounting sections 18. The dual-polarized radiators 3 are spaced apart from one another on the first side 2*a* of the reflector arrangement 2 in the longitudinal direction of the mobile communication antenna 1. The dual-polarized radiators 3 are preferably attached to the connecting element 16 by using a snap in connection. The connection is preferably solder free.

Furthermore, the first support frame structure 4 is arranged on the first side 2*a* of the reflector arrangement 2 and is directly or indirectly connected to the reflector arrangement 2. Within FIG. 2A the connection is of an indirect type, because first and second profile arrangements 7, 8 are used.

The first and second profile arrangements 7, 8 are arranged next to each other and extend in the longitudinal direction of the mobile communication antenna 1. The first and the second profile arrangements 7, 8 are arranged at least on the second side 2*b* of the reflector arrangement 2. As can be seen, the first and the second profile arrangements are also arranged on the first side 2*a* of the reflector arrangement 2. The first profile arrangement 7 is connected to the reflector arrangement 2. The first profile arrangement 7 is also connected to the first support section 14 of the first support frame structure 4. The second profile arrangement 8 is connected to the reflector arrangement 2 and to the second support section 15 of the first support frame structure 4. The connection is preferably a plug connection which could also comprise snap in elements for fixation.

The first profile arrangement 7 comprises a fastening area 19, wherein the fastening area 19 comprises at least one first receiving groove (a first receiving projection would also be possible). The first receiving groove extends in the longitudinal direction of the mobile communication antenna 1 and is preferably arranged on the first side 2*a* of the reflector arrangement 2. The first supporting section 14 of the first support frame structure 4 engages in the at least one first receiving groove. The second profile arrangement 8 also comprises a fastening area 19, wherein the fastening area 19 comprises at least one first receiving groove (a first receiving projection would also be possible). The first receiving groove extends in the longitudinal direction of the mobile communication antenna 1 and is probably arranged on the first side 2*a* of the reflector arrangement 2. The second supporting section 15 of the first support frame structure 4 engages in the at least one first receiving groove.

The profile arrangement 7, 8 of FIG. 2A is also shown in FIG. 2E. The profile arrangement 7, 8 could be made of a single piece but could also be made of several pieces which would be arranged next to each other in the longitudinal direction of the mobile communication antenna 1. They could also be spaced apart from each other the longitudinal direction of the mobile communication antenna 1 (which does not necessarily have to be the case).

The first support frame structure 4 is attached in the respective first receiving groove of the first and second profile arrangement 7, 8 at a predetermined position or at an arbitrary position. A predetermined position could be achieved if a snap in connection rests into the respective counterpart. An arbitrary position could be achieved by using a clamped connection for example.

The first profile arrangement 7 encloses (at least partly) at least one first receiving room 20 on the second side 2*b* of the reflector arrangement 2, wherein a signal distribution unit 10 is arranged in this at least one first receiving room 20. The receiving room 20 is preferably open to one end, so that an electronic module, especially in form of the signal distribution unit 10 can preferably plugged into/pushed into the receiving room 20. The signal distribution unit 10 preferably stays within the receiving room 20 because of fastening means like a snap in connection or clamping means.

The second profile arrangement 8 also encloses (at least partly) at least one first receiving room 20 on the second side 2*b* of the reflector arrangement 2, wherein the electronic module, especially in form of a signal distribution unit 10 is arranged in this at least one first receiving room 20. The receiving room 20 is preferably open to one end, so that the signal distribution unit 10 can preferably plugged into/pushed into the receiving room 20. The signal distribution unit 10 preferably stays within the receiving room 20 because of fastening means like a snap in connection or clamping means.

The reflector arrangement 2 could be clamped and/or screwed to the respective first and second profile arrangement 7, 8. Preferably, the end parts of the reflector arrangement 2 are bent (for example perpendicular to the rest of the reflector arrangement 2), wherein the bent parts of the reflector arrangement 2 could then be inserted into grooves of the first and the second profile arrangements 7, 8. The first and second profile arrangement 7, 8 preferably comprise a metal or metal alloy or consist of a metal or metal alloy. Preferably, the first and the second profile arrangements 7, 8 are an extruded part. Preferably, most parts of the first and the second profile arrangements 7, 8 are arranged on the second side 2*b* of the reflector arrangement 2. The first and the second profile arrangements 7, 8 are preferably made of a single piece.

FIG. 2B shows another cross section through the mobile communication antenna 1. In that case, second and a third support frame structures 5, 6 are provided. The second and the third support frame structures 5, 6 are arranged next to each other and are also arranged at least partially (or fully) in the first receiving room 17 of the first support frame structure 4. The second and the third support frame structure 5, 6 each comprise a first support section 14 and a second support section 15. The first support section 14 and the second support section 15 of the respective second and third support frame structures 5, 6 are arranged side-by-side and extend in the longitudinal direction of the mobile communication antenna 1. The second support frame structure 5 comprises a connecting element 16 which connects the first and the second support sections 14, 15 in a bridge-like manner and spans a second receiving room 23. The third support frame structure 6 comprises a connecting element 16 which connects the first and the second support sections 14, 15 in a bridge-like manner and spans a third receiving room 24. The second and the third support frame structures 5, 6 are arranged on the first side 2*a* of the reflector arrangement 2 and are directly or indirectly connected to the reflector arrangement 2. In this case they are indirectly connected to the reflector arrangement 2. The first profile arrangement 7 and a second profile arrangement 8 each comprise a second receiving groove (or a second receiving projection) which extends in the longitudinal direction of the mobile communication antenna 1 and which is arranged on the first side 2*a* of the reflector arrangement 2. The first supporting section 14 of the second support frame structure 5 is arranged in the at least one second receiving groove of the first profile arrangement 7. Furthermore, the second supporting section 15 of the third support frame structure 6 is arranged in the second receiving groove of the second profile arrangement 8.

Furthermore, a third profile arrangement 9 is arranged at least on the second side 2*b* of the reflector arrangement 2. The third profile arrangement 9 is arranged between the first and the second profile arrangements 7, 8 and also extends in the longitudinal direction of the mobile communication antenna 1. The third profile arrangement 9 is preferably connected with the second support section 15 of the second support frame structure 5 and the first support section 14 of the third support frame structure 6. In addition or alternatively, the third profile arrangement 9 could also be connected with the reflector arrangement 2.

The profile arrangement 7, 8, 9 of FIG. 2B is also shown in FIG. 2F. The profile arrangement 7, 8, 9 could be made of a single piece but could also be made of several pieces which would be arranged next to each other in the longitudinal direction of the mobile communication antenna 1. They could also be spaced apart from each other (which does not necessarily have to be the case).

The third profile arrangement 9 comprises a fastening area 19, wherein the fastening area 19 comprises at least one first receiving groove and one second receiving groove. The second supporting section 15 of the second support frame structure 5 is arranged within the first receiving groove of the third profile arrangement 9. The first supporting section 14 of the third support frame structure 6 is arranged within the second receiving groove of the third profile arrangement 9. Instead of the groove also projection could be used.

The first, second and/or third support frame structures 4, 5, 6 can be arranged within the respective first and/or second receiving grooves at a predetermined position or at an arbitrary position.

FIG. 2B also shows that the first profile arrangement 7, the second profile arrangement 8 and the third profile arrangement 9 encloses a first receiving room 20 and a second receiving room 21 on the second side 2*b* of the reflector arrangement 2. Both receiving rooms 20, 21 can be fully separated from each other or partly separated from each other.

The connecting element 16 of the respective second and third support frame structure 5, 6 comprises a plurality of mounting sections 18, wherein dual-polarized radiators 3 are attached on at least some or all of the mounting sections 18. The dual-polarized radiators 3 on each connecting element 18 are arranged on the first side 2*a* of the reflector arrangement 2 and are spaced apart from one another in the longitudinal direction of the mobile communication antenna 1.

Preferably, there are also one or more spacers 13 which are arranged between the connecting element 16 of the first support frame structure 4 and the connecting element 16 of the second support frame structure 5 and/or the third support frame structure 6.

It would also be possible that one or more spacers 13 are arranged between the connecting element 16 of the second support frame structure 5 and the reflector arrangement 2 and/or between the connecting element 16 of the third support frame structure 6 and a reflector arrangement 2. In general, there could also be one or more spacers 13 arranged between the connecting element 16 of the first support frame structure 4 and the reflector arrangement 2.

FIG. 2C shows the same cross section through the mobile communication antenna 1 as FIG. 2B but with the dual-polarized radiators 3. Dual-polarized low band radiators 3*a* are attached to the mounting sections 18 on the connecting element 16 of the first support frame structure 4. There are two columns which means that dual-polarized low band radiators 3*a* are arranged next to each other in separate columns and are spaced from each other in the longitudinal direction of the mobile communication antenna 1.

Dual-polarized mid band radiators 3*b* are attached to the mounting sections 18 on the connecting element 16 of the second and third support frame structures 5, 6. There are two columns in each of the second and third support frame structures 5, 6 which means that dual-polarized mid band radiators 3*b* are arranged next to each other in separate columns and are spaced from each other in the longitudinal direction of the mobile communication antenna 1.

Dual-polarized high band radiators 3*c* are attached on the reflector arrangement 2. The dual-polarized high band radiators 3*c* are preferably arranged within the second receiving room 23 and the third receiving room 24. More preferably, the dual-polarized high band radiators 3*c* are also arranged within the first receiving room 20. The dual-polarized high band radiators 3*c* are preferably arranged in two arrays which are arranged next to each other (one array in the second receiving room 23 and one array in the third receiving room 24). Each array comprises a plurality of columns (in this example four columns), wherein each column comprises a plurality of dual-polarized high band radiators 3*c* that are spaced apart in the longitudinal direction of the mobile communication antenna 1. The high band radiators 3*c* are preferably configured in such a way that mMIMO operation is possible.

Active components 25 comprising for example power amplifiers and/or low noise amplifiers, are preferably arranged on the second side 2*b* of the reflector arrangement 2 underneath the high band radiators 3*c*. Those active components 25 are preferably only connected to that part of the reflector arrangement 2 which is exchangeable together with the plurality of high band radiators 3*c*.

Each of the first, second and third profile arrangements 7, 8, 9 preferably comprises a first and the second receiving room 20, 21, wherein a respective signal distribution unit 10 is arranged in each of the receiving rooms 20, 21.

FIG. 2D shows a cross section through a similar mobile communication antenna 1 as FIG. 2B. However, besides the first support frame structure 4 only a second support frame structure 5 is provided. The second support frame structure 5 is at least partially or fully arranged in the first receiving room 17 of the first support frame structure 4.

As such, dual-polarized high band radiators 3*c* which are attached on the reflector arrangement 2 have preferably the same distance to each other in a direction perpendicular to the longitudinal direction of the mobile communication antenna 1. They preferably also have the same distance to each other in the longitudinal direction of the mobile communication antenna 1. In that case eight columns are provided each comprising a plurality of dual-polarized high band radiators 3*c*. However, also a different number of columns like two, three, four, five, six, seven, nine, ten, eleven, twelve and even more could be provided.

The high band radiators 3*c* could be arranged on an exchangeable plate of the reflector arrangement 2. This exchangeable plate could then be slid into the second receiving room 23 on demand. This could even be done while the mobile communication antenna 1 is mounted on the mast. In that case, at least a part of the reflector arrangement 2 which does not comprise any high band radiators 3*c* could be exchanged with the exchangeable plate of the reflector arrangement 2 comprising the high band radiators 3*c*. On the second side of this exchangeable plate of the reflector arrangement 2 active components 25 could be arranged suitable for the operation of the high band radiators 3*c*. As such, the exchangeable plate of the reflector arrangement 2 could be manufactured and tested before being installed.

The mobile communication antenna 1 could also comprises a mixed arrangement. Over a specific length in the longitudinal direction where the high band radiators 3*c* are arranged as well low band radiators 3*a* and mid band radiators 3*b* only a first and a second support frame structure 4, 5 could be used, wherein at other positions, where only low band radiators 3*a* and/or mid band radiators 3*b* are used, first, second and third support frame structures 4, 5, 6 could be used.

FIGS. 3A, 3B show three-dimensional views of the first support frame structure 4. Within FIG. 3A it can be seen that the first support frame structure 4 extends in the longitudinal direction of the mobile communication antenna 1. It comprises two columns, wherein eight dual-polarized low band radiators 3*a* are arranged within each column. However, the number of dual-polarized low band radiators 3*a* could be different. For example there could be 1, 2, 3, 4, 5, 6, 7, 8, 9, 10, 11, 12, 13 14, 15, 16 or more than 16 dual-polarized low band radiators 3*a* within each column.

The first support frame structure 4 could be made of a single piece. The first support frame structure 4 could also be subdivided into several separate first support frame structure modules 4*a* as shown in FIG. 3B for one module. The several separate first support frame structure modules 4*a* are then arranged adjacent to each other in the longitudinal direction of the mobile communication antenna 1. Each of the first support frame structure modules 4*a* could comprise 1, 2, 3, 4 or more than 4 columns, wherein exactly one dual-polarized radiator 3 (especially one dual-polarized low band radiator 3*a*) is arranged within each of the columns (as shown in FIG. 3A). However, it could also be possible that several dual-polarized radiators 3 (especially dual-polarized low band radiators 3*a*) are arranged within each of the columns.

By using several separate first support frame structure modules 4*a*, the distance between the respective dual-polarized radiators 3 along the longitudinal direction of the mobile communication antenna 1 could always be the same or could be different.

If several separate first support frame structure modules 4*a* are used, they could be jointed together at their respective first support section 14 and their second support section 15. They could also be aligned next each other without a spacing in between along the longitudinal direction of the mobile communication antenna 1.

The connecting element 16 of the first support frame structure 4 (or the separate first support frame structure module 4*a* as depicted in FIG. 3B) comprises a plurality of cross struts 26 which are preferably U-shaped and extend from the first support section 14 to the second support section 15. The connecting element 16 of the first support frame structure 4 also comprises one or more longitudinal struts 27 extending in the longitudinal direction of the mobile communication antenna 1. The one or more longitudinal struts 27 connect the cross struts 26 to each other. Preferably the respective longitudinal struts 27 and the cross struts 26 are made of common single piece. More preferably, each of the separate first support frame structure modules 4*a* is a single piece.

The at least one longitudinal strut 27 could also be hollow so that a cable pull could be passed inside. A coolant flow could also be passed through the at least one longitudinal strut 27.

At least one of the longitudinal struts 27 or all of the longitudinal struts 27 of the first support frame structure 4 are arranged exactly above at least one longitudinal strut 27 of the second support frame structure 5 and/or the third support frame structure 6. In that case, spacers 13 which would preferably be arranged at the longitudinal struts 27 would always be in contact with the other longitudinal strut 27 of the above first support frame structure 4 or in contact with the second or third support frame structure 5, 6 no matter whether the respective first, second and/also support frame structure 5 is moved along the longitudinal direction of the mobile communication antenna 1.

Other elements like a director 28 could also be added to the respective dual-polarized radiator 3. Preferably the director 28 could be attached to the already existing mounting section 18 above the respective dual-polarized radiator 3, so that the director 28 is not galvanically connected to the respective dual-polarized radiator 3. Preferably, the first support frame structure 4 comprises one or more guiding elements 29. Those guiding elements 29 can be used for fastening and/or holding and/or guiding first and second terminals 30*a*, 30*b* coming from the signal distribution unit 10. Those guiding elements 29 could also be used for fastening and/or holding and/or guiding a respective first and second connector 31*a*, 31*b* from the respective dual-polarized radiator 3.

As can be seen each dual-polarized radiator 3 has a first connector 31*a* for first polarization and the second connector 31*b* for a second polarization. Preferably, the first and the second connectors 31*a*, 31*b* are galvanically connected to the respective dual-polarized radiator 3 at the outer part of the respective radiating element. The connection could also be at the inner part. The connection could also be of a capacitive form. More preferably, the first and the second connector 31*a*, 31*b* run towards the respective sides of the first support frame structure 4 and from there at least partly towards the respective first support section 14 or second support section 15. More preferably, the first and the second connectors 31*a*, 31*b* of each of the dual-polarized radiators 3 are spaced apart in the longitudinal direction of the mobile communication antenna 1. If the first support frame structure 4 comprises two columns (as shown in FIG. 3B) then the first and the second connectors 31*a*, 31*b* of the dual-polarized radiators 3 in the first column run towards the first support section 14, wherein the first and the second connectors 31*a*, 31*b* of the dual-polarized radiators 3 in the second column run towards the second support section 15. It might also be possible, that the first and second connectors 31*a*, 31*b* of the dual-polarized radiators 3 in the first row and/or in the last row of the two columns run to the other (opposite) support section 15, 14. In that case an L wiring or X wiring is achieved.

Furthermore, the first support section 14 of the first support frame structure 4 comprises at least one fastening means 32 or a plurality of fastening means 32 which are spaced apart in the longitudinal direction of the mobile communication antenna 1 and which are arranged at least partly on the second side 2*b* of the reflector arrangement 2. The electronic module, especially in form of a signal distribution unit 10, is therefore hold by the at least one or by the plurality of fastening means 32. In Addition or alternatively, the second support section 15 of the first support frame structure 4 comprises at least one fastening means 32 or a plurality of fastening means 32 which are spaced apart in the longitudinal direction of the mobile communication antenna 1 and which are arranged at least partly on the second side 2*b* of the reflector arrangement 2. The electronic module, especially in form of a signal distribution unit 10, is therefore hold by the at least one or by the plurality of fastening means 32.

The respective fastening means 32 or the plurality of fastening means 32 are preferably U-shaped. The opening of the fastening means 32 preferably faces away from the reflector arrangement 2 so that the electronic module can be inserted into the opening by moving the electronic module towards the second side of the reflector arrangement 2. The electronic module is preferably hold by the fastening means 32 exerting a clamping force. Additional adhesive and/or screws could also be used.

FIG. 3B also shows a fastening means 32 also in the form of a clamping element 32 which has a U-shaped cross-section. The open part of the clamping element 32 faces away from the respective dual-polarized radiators 3 of the respective first support frame structure 4. The clamping element 32 is arranged at the lower end of the first and second support sections 14, 15. The respective clamping element 32 is configured to hold a signal distribution unit 10 or is configured to be attached to the first and/or second profile arrangement 7, 8.

The respective mobile communication antenna 1 could comprise both the respective profile arrangement 7, 8, 9 and the respective fastening means 32. However, one of these fastening methods would also be enough.

FIGS. 4A, 4B show three-dimensional views of the second and third support frame structures 5, 6. Within FIG. 4A it can be seen that the second and third support frame structures 5, 6 extend in the longitudinal direction of the mobile communication antenna 1. Each of the second and third support frame structures 5, 6 comprises two columns, wherein twelve dual-polarized mid band radiators 3*b* are arranged within each column. However, the number of dual-polarized mid band radiators 3*b* could also be different. For example there could be 4, 5, 6, 7, 8, 9, 10, 11, 12, 13 14, 15, 16 or more than 16 dual-polarized mid band radiators 3*b* within each column.

In general, all the aforementioned explanations regarding the first support frame structure 4 are preferably also true for the second support frame structure 5 and the third support frame structure 6. The only difference is that the second support frame structure 5 and the third support frame structure 6 (preferably) do not extend as far away from the reflector arrangement 2 as the first support frame structure 4. The second support frame structure 5 could also be made of a single piece. The third support frame structure 6 could also be made of a single piece. Both support frame structures 5, 6 could also be made of the common single piece. As can be seen, the second and the third support frame structure 5, 6 each comprises two columns. Within each column, there are twelve dual-polarized mid band radiators 3*b* arranged. The distance between two dual-polarized mid band radiators 3*b* of the same column the smaller compared to the distance between two dual-polarized low band radiators 3*a* of a column within the first support frame structure 4. The respective connecting element 16 of the second and the third support frame structure 5, 6 each preferably comprise a plurality of cross struts 26 which are U-shaped and extend from the respective first support section 14 to the second support section 15. Furthermore, the respective connecting element 16 comprises one or more longitudinal struts 27 extending in the longitudinal direction of the mobile communication antenna 1, wherein the one or more longitudinal struts 27 connect the respective cross struts 26 to each other.

Each of the dual-polarized mid band radiators 3*b* of the second and third support frame structures 5, 6 has a first connector 31*a* for a first polarization and a second connector 31*b* for a second polarization. The first and second connectors 31*a*, 31*b* of the first column in the second support frame structure 5 run towards the first support section 14 of the second support frame structure 5. If there is a profile arrangement used, then they would run towards the first profile arrangement 7.

The first and second connectors 31*a*, 31*b* of the second column in the second support frame structure 5 run towards the second support section 15 of the second support frame structure 5. If there is a profile arrangement used, then they would run towards the third profile arrangement 9.

The first and second connectors 31*a*, 31*b* of the first column in the third support frame structure 6 run towards the first support section 14 of the third support frame structure 6. If there is a profile arrangement used, then they would run towards the third profile arrangement 9.

The first and second connectors 31*a*, 31*b* of the second column in the third support frame structure 6 run towards the second support section 15 of the third support frame structure 6. If there is a profile arrangement used, then they would run towards the second profile arrangement 8.

Instead of a first, second and third profile arrangement 7, 8, 9 or in addition thereto, respective fastening means 32 could be used as well as shown in FIG. 4A.

The first support section 14 of the second support frame structure 5 comprises at least one fastening means 32 or a plurality of fastening means 32 which are spaced apart in the longitudinal direction of the mobile communication antenna 1 and which are arranged at least partly on the second side 2*b* of the reflector arrangement 2. The electronic module, especially in form of a signal distribution unit 10, is therefore hold by the at least one or by the plurality of fastening means 32. In Addition or alternatively, the second support section 15 of the second support frame structure 5 comprises at least one fastening means 32 or a plurality of fastening means 32 which are spaced apart in the longitudinal direction of the mobile communication antenna 1 and which are arranged at least partly on the second side 2*b* of the reflector arrangement 2. The electronic module, especially in form of a signal distribution unit 10, is therefore hold by the at least one or by the plurality of fastening means 32.

Furthermore, the first support section 14 of the third support frame structure 6 comprises at least one fastening means 32 or a plurality of fastening means 32 which are spaced apart in the longitudinal direction of the mobile communication antenna 1 and which are arranged at least partly on the second side 2*b* of the reflector arrangement 2. The electronic module, especially in form of a signal distribution unit 10, is therefore hold by the at least one or by the plurality of fastening means 32. In Addition or alternatively, the second support section 15 of the third support frame structure 6 comprises at least one fastening means 32 or a plurality of fastening means 32 which are spaced apart in the longitudinal direction of the mobile communication antenna 1 and which are arranged at least partly on the second side 2*b* of the reflector arrangement 2. The electronic module, especially in form of a signal distribution unit 10, is therefore hold by the at least one or by the plurality of fastening means 32.

The second and third support frame structures 5, 6 also comprise clamping elements 32.

FIG. 4B also shows separate second and/or third support frame structure modules 5*a*, 6*a*. A spacer 13 extends from the respective lower part of the first support section 14 and/or second support section 15 into the reflector arrangement 2 below and protrudes from the second side 2*b* of the reflector arrangement 2. In that case the radome 12 or the radome foil gains stability. The free end of the spacer 13 is preferably round or flat.

FIG. 5 shows a three-dimensional view of the first, second and third support frame structures 4, 5, 6 which comprise the fastening means 32 for holding (for example by clamping) the electronic module in form of a signal distribution unit 10. The reflector arrangement 2 is not shown in this embodiment. The signal distribution unit could also be hold by first, second and third profile arrangements 7, 8, 9. In that case, the respective first, second and third profile arrangements 7, 8, 9 extend in the longitudinal direction of the mobile communication antenna 1. The fastening means 32 or in another not shown embodiment the first profile arrangement 7 comprises or holds two signal distribution units 10 which are arranged in the respective first receiving room 20 and the second receiving room 21. Other fastening means 32 or the second profile arrangement 8 comprises or holds two signal distribution units 10 which are arranged in the first receiving room 20 and the second receiving room 21. Other fastening means or the third profile arrangement 9 comprises or holds two signal distribution units 10 which are arranged in the first receiving room 20 and the second receiving room 21.

Preferably, there are as many signal distribution units 10 as there are columns of dual-polarized low band radiators 3*a* and dual-polarized mid band radiators 3*b*. As will be explained below, each signal distribution unit 10 is configured to transmit and receive a mobile communication signal in a first polarization and in a second polarization to and from the respective radiators 3 in one column of the respective first, second and third support frame structures 4, 5, 6.

If the customer needs fewer radiators 3 in each row, fewer separate first support frame structure modules 4*a* and/or fewer separate second support frame structure modules 5*a* and/or fewer separate third support frame structure modules 6*a* are used.

FIG. 6 shows a three-dimensional view of the connection between the first support frame structure 4 and the reflector arrangement 2. In this case no profile arrangement 7, 8, 9 is used. Instead, the first support frame structure 4 is directly connected to two signal distribution units 10 by the use of the fastening means 32 (for example clamping elements). The reflector arrangement 2 is also connected to the signal distribution units 10 and the first support frame structure 4. The first support section 14 of the first support frame structure 4 is connected to one signal distribution unit 10. The second support section 15 of the first support frame structure 4 is connected to another signal distribution unit 10. The fastening means 32 are used to encompass (at least partly) the respective signal distribution unit 10.

FIGS. 7A, 7B and 7C show additional three-dimensional views of the signal distribution unit 10. The signal distribution unit 10 comprises at least one dual-signal distributor 10*a*. Each dual-signal distributor 10*a* has first terminals 34*a* and second terminals 34*b*. The number of first terminals 34*a* preferably equals the number of first connectors 31*a* of the dual-polarized radiators 3 within one column. The number of second terminals 34*b* preferably equals the number of the second connectors 31*b* of the dual-polarized radiators 3 within one column. It could also be possible that some first connectors 31*a* of different dual-polarized radiators 3 (preferably the connectors from the radiators 3 in the middle of the column) within one column are connected together and then connected/coupled to one first terminal 34*a*. It could then also be possible that some second connectors 31*b* of different dual-polarized radiators 3 (preferably the connectors from the dual-polarized radiators 3 in the middle of the column) within one column are connected together and then connected/coupled to one second terminal 34*b*.

Each first and second terminal 34*a*, 34*b* is preferably a strip line and more preferably a microstrip. As such, the first and second terminal 34*a*, 34*b* comprises a signal line 35 and a ground line 36 both running parallel to each other. A cable connection (for example by using a coaxial cable) could also be possible.

The first connector 31*a* of the dual-polarized radiator 3 runs at least parallel over a part of its length (next) to the signal line 35 and therefore also to the ground line 36 of a first terminal 34*a*. The signal line 35 is preferably in the middle of the ground line 36 and the first connector 31*a*. The second connector 31*b* of the dual-polarized radiator 3 runs at least parallel over a part of its length to the signal line 35 and therefore also to the ground line 36 of a second terminal 34*b*. The signal line 35 is preferably in the middle of the ground line 36 and the second connector 31*b*. The connection between the respective first connector 31*a* of the dual-polarized radiator 3 and the first terminal 34*a* is a capacitive coupling and the connection between the respective second connector 31*b* of the dual-polarized radiator 3 and the second terminal 34*b* is a capacitive coupling. A galvanic coupling, for example by using a solder joints would also be possible.

The dual-signal distributor 10*a* comprises 2 housing halves 37*a*, 37*b* and the partition wall 38 arranged between them. As such, two separate chambers are formed. A first phase shifter 39*a* used for a first polarization is arranged in the first chamber. The plurality of ports of the first phase shifter 39*a* are connected via the plurality of first terminals 34*a* of the dual signal distributor 10*a* to the plurality of first connectors 31*a* of the dual-polarized radiators 3 of a column. A second phase shifter 39*b* used for a second polarization is arranged in the second chamber. The plurality of ports of the second phase shifter 39*b* are connected via the plurality of second terminals 34*b* of the dual signal distributor 10*a* to the plurality of second connectors 31*b* of the dual-polarized radiators 3 of a column. The housing halves 37*a*, 37*b* therefore have openings so that the first and the second terminals 34*a*, 34*b* can extend through. The ground line 36 of the respective terminal 34*a*, 34*b* and the respective housing halve 37*a*, 37*b* are preferably made of a single piece. The signal line 35 and the ground line 36 are preferably free of any bends and extend more preferably in a respective plane.

The plurality of first terminals 34*a* and the plurality of second terminals 34*b* are spaced apart from one another in the longitudinal direction of the mobile communication antenna 1. The first terminal 34*a* is preferably also spaced in a direction perpendicular to the longitudinal direction of the mobile communication antenna 1 from the second terminal 34*b*.

Both housing halves 37*a*, 37*b* could be soldered and/or pressed and/or screwed together. The first and the second phase shifters 39*a*, 39*b* are preferably linear phase shifters 39*a*, 39*b*.

FIG. 7C shows that the partition wall 38 could also be a part of an end portion of the reflector arrangement 2 which is bent approximately perpendicular to the rest of the reflector arrangement 2.

Instead of using a dual signal distributor 10*a* several (especially two) single-signal distributors 10*b* could also be used. Various embodiments of single-signal distributors 10*b* are shown in FIGS. 8A, 8B, 9, 10A, 10B, 10C, 10D and 10E. Since each single-signal distributor 10*b* only supports one polarization, two different types of single-signal distributors 10*b* are used. A first single-signal distributor $\mathbf{10}b_1$ is used for a first polarization, wherein second single-signal distributor $\mathbf{10}b_2$ is used for a second polarization.

The first single-signal distributor $\mathbf{10}b_1$ comprises two housing halves 37*a*, 37*b*. A phase shifter for mobile communication signals of a first polarization is arranged between the two housing halves 37*a*, 37*b*, wherein the plurality of ports of the phase shifter are connected via the plurality of first terminals 34*a* of the first single-signal distributor $\mathbf{10}b_1$ to the plurality of first connectors 31*a* of the dual-polarized radiators 3 of a column.

In addition, a second single-signal distributor $\mathbf{10}b_2$ comprises two housing halves 37*a*, 37*b*. A phase shifter for mobile communication signals of a second polarization is arranged between the two housing halves 37*a*, 37*b*, wherein the plurality of ports of the phase shifter are connected via the plurality of second terminals 34*b* of the second single-signal distributor $\mathbf{10}b_2$ to the plurality of second connectors 31*b* of the dual-polarized radiators 3 of a column.

Figure 10B:
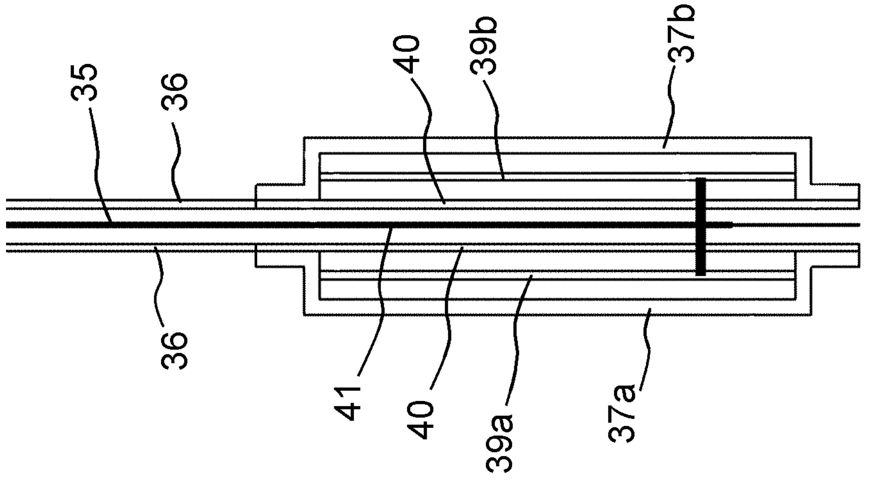
Figure 10A:
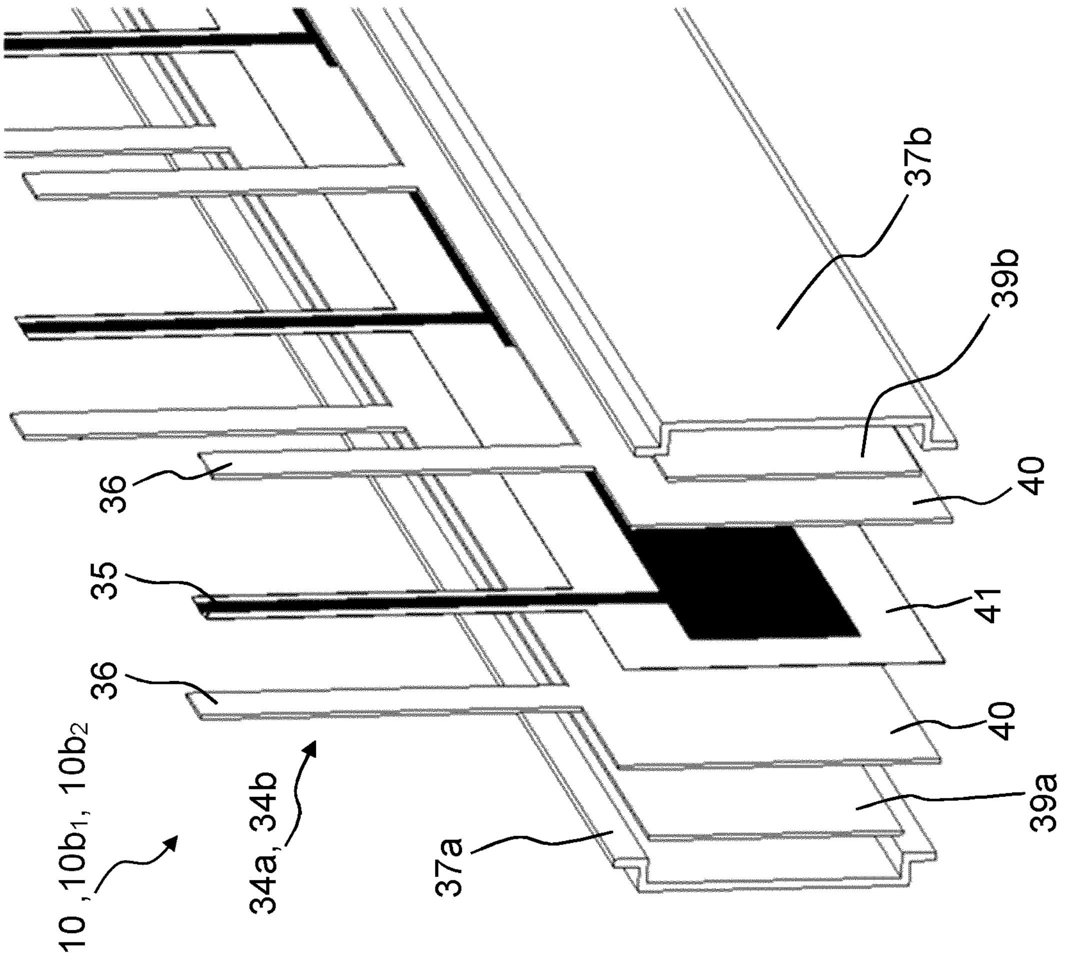

Another embodiment of a first and/or second single-signal distributor $\mathbf{10}b_1$, $\mathbf{10}b_2$ is shown in FIG. 10A. Preferably two partitions 40 are arranged between the housing halves 37*a*, 37*b*, thereby forming at least three separate chambers. A first phase shifter 39*a* for mobile communication signals of a first polarization and a first frequency range (for example a first mobile communication band) is arranged in the first chamber. A second phase shifter 39*b* for mobile communication signals of a first polarization and a second frequency range (for example a second mobile communication band different from the first mobile communication band) is arranged in the second chamber. A printed circuit board arrangement 41 is arranged in the third chamber, wherein the printed circuit board arrangement 41 comprises a circuit structure configured to connect a respective one of the ports of the first phase shifter 39*a* and a respective one of the ports of the second phase shifter 39*b* to each other and to a respective first terminal 34*a* of the first single-signal distributor $\mathbf{10}b_1$, wherein the plurality of first terminals 34*a* of the first single-signal distributor $\mathbf{10}b_1$ are connected to the plurality of first connectors 31*a* of the dual-polarized radiators 3 of a column.

The second single-signal distributor $\mathbf{10}b_2$ also comprises (two) partitions 40 arranged between the housing halves 37*a*, 37*b*, thereby forming at least three separate chambers. A first phase shifter 39*a* for mobile communication signals of a second polarization and a first frequency range (for example a first mobile communication band) is arranged in the first chamber. A second phase shifter 39*b* for mobile communication signals of a second polarization and a second frequency range (for example a second mobile communication band different from the first mobile communication band) is arranged in the second chamber. A printed circuit board arrangement 41 is arranged in the third chamber, wherein the printed circuit board arrangement 41 comprises a circuit structure configured to connect a respective one of the ports of the first phase shifter 39*a* and a respective one of the ports of the second phase shifter 39*b* to each other and to a respective second terminal 34*b* of the second single-signal distributor $\mathbf{10}b_2$, wherein the plurality of second terminals 34*b* of the second single-signal distributor $\mathbf{10}b_b$ are connected to the plurality of second connectors 31*b* of the dual-polarized radiators 3 of a column. Instead of a printed circuit board arrangement 41, a sheet metal part arrangement or a coated plastic material arrangement could also be used.

Within the embodiments of FIGS. 10A and 10B, there are two ground lines 36 running parallel to each other and one signal line 35 running parallel to the ground lines 36 in between them.

The first and second single-signal distributors $\mathbf{10}b_1$, $\mathbf{10}b_2$ shown in FIG. 10A, 10B are aligned vertically. This means that the printed circuit board arrangement 41 is preferably arranged perpendicular to the reflector arrangement 2. The respective first, second and third chambers are aligned next to each other in the horizontal direction. Within FIG. 10C, the first and the second chambers comprising the first and the second phase shifter 39*a*, 39*b* are spaced apart from each other in the vertical direction (on top of each other). The third chamber is spaced apart from the first and the second chambers in the horizontal direction. In that case only one ground line 36 and one signal line 35 protrude from the two housing halves 37*a*, 37*b*.

Figure 10E:
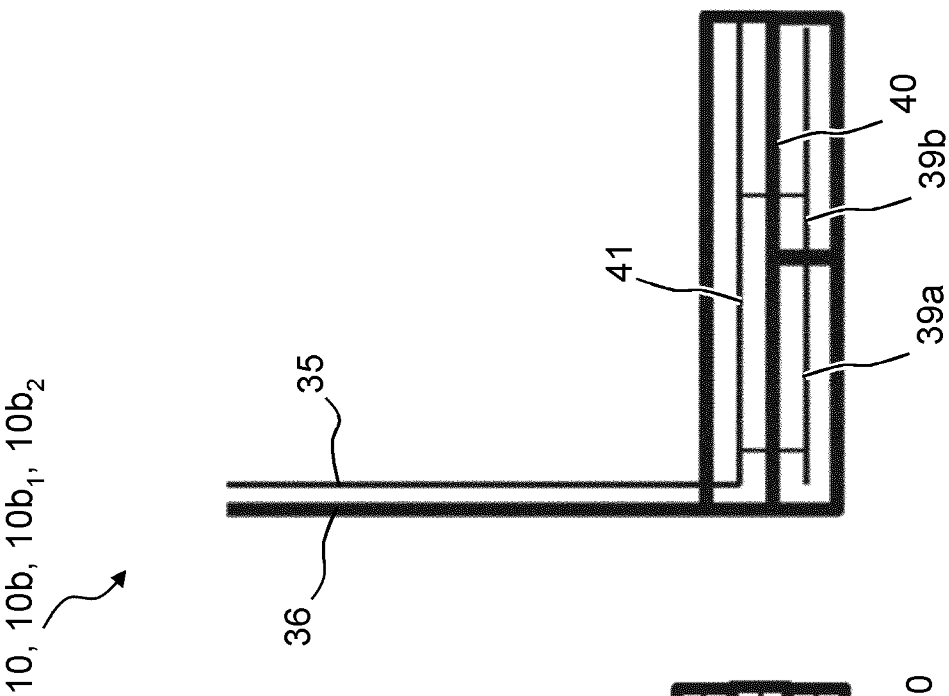
Figure 10D:
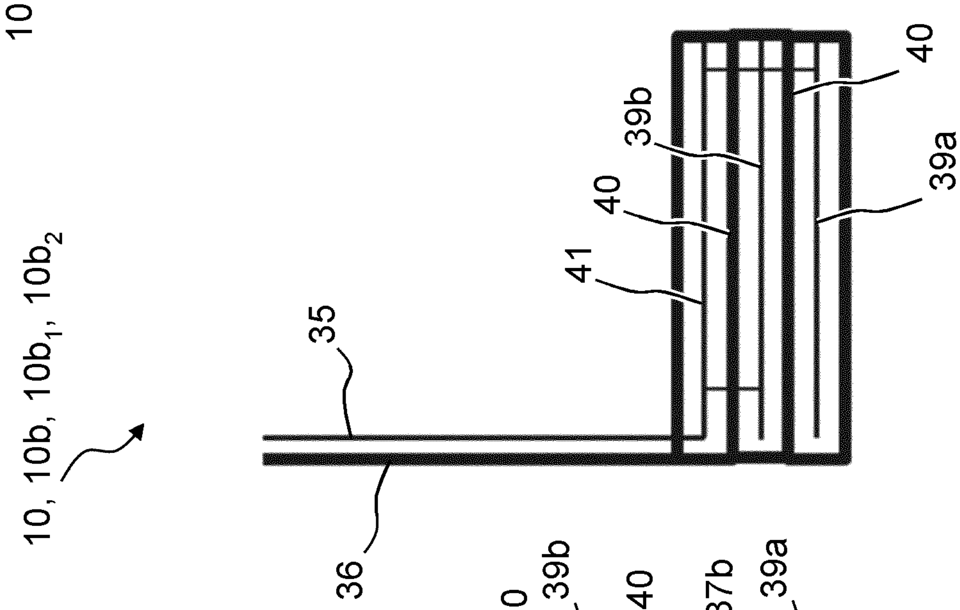
Figure 10C:
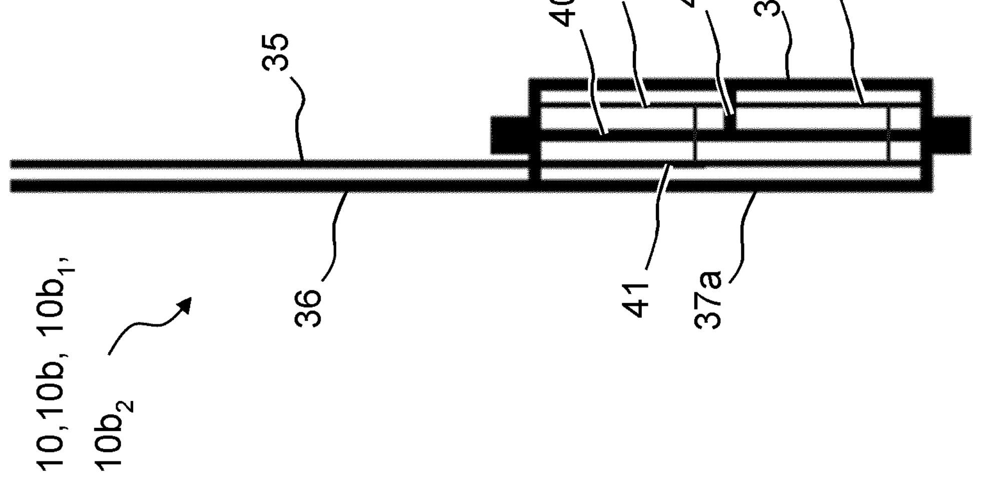

Within FIG. 10D, the first, the second and the third chambers are arranged on top of each other (spaced apart in the vertical direction). In that case only one ground line 36 and one signal line 35 protrude from the two housing halves 37*a*, 37*b*.

Within FIG. 10E, the first and the second chambers (comprising the first and the second phase shifters 39*a*, 39*b*) are spaced from each other in the horizontal direction, wherein the third chamber is arranged on top of the first and a second chamber and spaced apart from them in the vertical direction. In that case only one ground line 36 and one signal line 35 protrude from the two housing halves 37*a*, 37*b*.

FIG. 11 shows another cross-section through the mobile communication antenna 1 indicating that the respective signal distribution unit 10 is directly arranged underneath the respective dual-polarized radiator 3. In that case there is one signal distribution unit 10 which extends in the longitudinal direction of the mobile communication antenna 1 underneath each column of dual-polarized radiators. The first and the second terminals 34*a*, 34*b* protrude from the housing halves 37*a*, 37*b* directly to the radiating elements of the respective dual-polarized radiators 3. The first terminal 34*a* preferably only runs in a single plane perpendicular to the reflector arrangement 2. The second terminal 34*b* preferably only runs in a single plane perpendicular to the reflector arrangement 2.

The common port of each first and second phase shifter 39*a*, 39*b* is preferably visible at the front side of the signal distribution unit 10.

FIG. 12A, 12B, 12C show various three-dimensional views of the mobile communication antenna 1 indicating that a part of the reflector arrangement 2 together with the dual-polarized high band radiators 3*c* can be exchanged on site.

The dual-polarized high band radiators 3*c* are preferably at least partially or completely arranged in the first receiving room 17 of the first support frame structure 4. The respective part of the reflector arrangement 2 on which the dual-polarized high band radiators 3*c* are arranged is configured to be pulled out of the mobile communication antenna 1 so that it can be replaced even if the mobile communication antenna 1 is mounted at the mast. Within FIG. 12A, the first array of dual-polarized high band radiators 3*c* are arranged on a first tray and the second array of dual-polarized high band radiators 3*c* are arranged on a second tray. Both trays can preferably be pulled out of the mobile communication antenna 1 independently from one another.

Within FIG. 12B, there are no active components 25 arranged at the second side 2*b* of the respective part of the reflector arrangement 2. The respective first tray is removed in FIG. 12B and replaced with another one depicted in FIG. 12C comprising active components 25.

In the following, some embodiments of the mobile communication antenna 1 are described separately. The first support frame structure 4 is preferably attached to the respective first and second profile arrangements 7, 8 without the use of screws and/or solder joints. The same is also true for the second support frame structure 5 with respect to the first and third profile arrangements 7, 9 and for the third support frame structure 7 with respect to second and third profile arrangements 8, 9.

If the respective first, second, third support frame structures 5, 6, 7 are directly connected to a signal distribution unit 10, this connection is preferably also free of a screw connection and/or free of solder joints. This connection is preferably done by fastening means 32.

More preferably, the first, second and/or third support frame structures 5, 6, 7 can be exchanged from the mobile communication antenna without removing any screws. The first, second and/or third support frame structures 5, 6, 7 preferably comprise a detachable mechanical connection (for example snap in connections, clamping connections) that can be removed without using any tools.

More preferably, the first, second and/or third support frame structures 5, 6, 7 are modular support frame structures.

The respective signal distribution unit 10 can preferably also be mounted to the respective profile arrangement 7, 8, 9 without any screws and/or solder joints. This can be done by using a detachable mechanical connection (for example snap in connections, clamping connections) for example.

The respective signal distribution unit 10 can preferably also be mounted to the dual-polarized radiators 3*a*, 3*b* without any screws and/or solder joints. This can be done by using a detachable mechanical connection (for example snap in connections, clamping connections) for example.

In General, the mobile communication antenna 1 might comprise three different layers of dual-polarized radiators 3*a*, 3*b*, 3*c*, wherein all three layers are arranged on the first side 2*a* of the reflector arrangement 2. The first layer comprising the low band dual-polarized radiators 3*a* is furthest away from the reflector arrangement 2. The third layer comprising the high band dual-polarized radiators 3*c* is located closest to the reflector arrangement 2. The second layer comprising the mid band dual-polarized radiators 3*b* is located between the first layer and the third layer. One layer, two layers or all three layers can be present in the mobile communication antenna 1.

The high band dual-polarized radiators 3*c* preferably extend the least far in the longitudinal direction of the mobile communication antenna 1. The low band dual-polarized radiators 3*a* preferably extend furthest in the longitudinal direction of the mobile communication antenna 1. The mid band dual-polarized radiators 3*b* preferably extend further in the longitudinal direction of the mobile communication antenna 1 than the high band dual-polarized radiators 3*c* but preferably not as far as the low band dual-polarized radiators 3*a*.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A mobile communication antenna comprising the following features:

a reflector arrangement is provided;

a plurality of dual-polarized radiators are provided;

a first support frame structure is provided, wherein the first support frame structure comprises a first support section and a second support section;

the first support section and the second support section are arranged side by side and extend in the longitudinal direction of the mobile communication antenna;

the first support frame structure comprises a connecting element which connects the first and second support sections in a bridge-like manner and spans a first receiving room;

the first support frame structure is arranged on a first side of the reflector arrangement and is directly or indirectly connected to the reflector arrangement;

the connecting element comprises a plurality of mounting sections, wherein the plurality of dual-polarized radiators are mounted on at least some or all of the mounting sections, wherein the plurality of dual-polarized radiators are spaced apart from one another on the first side of the reflector arrangement at least in the longitudinal direction of the mobile communication antenna.

2. The mobile communication antenna according to claim 1, characterized by the following features:

a second support frame structure is provided, wherein the second support frame structure is arranged:

a) next to the first support frame structure; or b) at least partially in the first receiving room of the first support frame structure;

the second support frame structure comprises a first support section and a second support section;

the first support section and the second support section are arranged side by side and extend in the longitudinal direction of the mobile communication antenna;

the second support frame structure comprises a connecting element which connects the first and second support sections in a bridge-like manner and spans a second receiving room;

the second support frame structure is arranged on the first side of the reflector arrangement and is directly or indirectly connected to the reflector arrangement;

the connecting element comprises a plurality of mounting sections, wherein a dual-polarized radiator of the plurality of dual-polarized radiators is mounted on at least some or all of the mounting sections, wherein dual-polarized radiators are spaced apart from one another on the first side of the reflector arrangement at least in the longitudinal direction of the mobile communication antenna.

3. The mobile communication antenna according to claim 1, characterized by the following features:

a second and a third support frame structure are provided, wherein the second and the third support frame structure are arranged next to each other and at least partially in the first receiving room of the first support frame structure;

the second and the third support frame structures each comprise a first support section and a second support section;

the first support section and the second support section of the respective second and third support frame structure are arranged side by side and extend in the longitudinal direction of the mobile communication antenna;

the second support frame structure comprises a connecting element which connects the first and the second support section in a bridge-like manner and spans a second receiving room;

the third support frame structure comprises a connecting element which connects the first and the second support section in a bridge-like manner and spans a third receiving room;

the second and the third support frame structure are arranged on the first side of the reflector arrangement and are directly or indirectly connected to the reflector arrangement;

the connecting element of the respective second and third support frame structure comprises a plurality of mounting sections, wherein a dual-polarized radiator of the plurality of dual-polarized radiators is mounted on at least some or all of the mounting sections, wherein dual-polarized radiators on each connecting element are arranged on the first side of the reflector arrangement and are spaced apart from one another at least in the longitudinal direction of the mobile communication antenna.

4. The mobile communication antenna according to claim 3, characterized by the following features:

one or more spacers are arranged between the connecting element of the first support frame structure and the connecting element of the second support frame structure and/or one or more spacers are arranged between the connecting element of the first support frame structure and the connecting element of the third support frame structure; and/or one or more spacers are arranged between the connecting element of the second support frame structure and the reflector arrangement and/or one or more spacers are arranged between the connecting element of the third support frame structure and the reflector arrangement; and/or one or more spacers are arranged between the connecting element of the first support frame structure and the reflector arrangement.

5. The mobile communication antenna according to claim 1, characterized by the following features:

the first support section of the first support frame structure comprises at least one fastening means or a plurality of fastening means which are spaced apart in the longitudinal direction of the mobile communication antenna and which are arranged at least partly on the second side of the reflector arrangement, wherein an electronic module, especially in form of a signal distribution unit, is hold by the at least one or by the plurality of fastening means; and/or the second support section of the first support frame structure comprises at least one fastening means or a plurality of fastening means which are spaced apart in the longitudinal direction of the mobile communication antenna and which are arranged at least partly on the second side of the reflector arrangement, wherein an electronic module, especially in form of a signal distribution unit, is hold by the at least one or by the plurality of fastening means; and/or the first support section of the second support frame structure comprises at least one fastening means or a plurality of fastening means which are spaced apart in the longitudinal direction of the mobile communication antenna and which are arranged at least partly on the second side of the reflector arrangement, wherein an electronic module, especially in form of a signal distribution unit, is hold by the at least one or by the plurality of fastening means; and/or the second support section of the second support frame structure comprises at least one fastening means or a plurality of fastening means which are spaced apart in the longitudinal direction of the mobile communication antenna and which are arranged at least partly on the second side of the reflector arrangement, wherein an electronic module, especially in form of a signal distribution unit, is hold by the at least one or by the plurality of fastening means; and/or the first support section of the third support frame structure comprises at least one fastening means or a plurality of fastening means which are spaced apart in the longitudinal direction of the mobile communication antenna and which are arranged at least partly on the second side of the reflector arrangement, wherein an electronic module, especially in form of a signal distribution unit, is hold by the at least one or by the plurality of fastening means; and/or the second support section of the third support frame structure comprises at least one fastening means or a plurality of fastening means which are spaced apart in the longitudinal direction of the mobile communication antenna and which are arranged at least partly on the second side of the reflector arrangement, wherein an electronic module, especially in form of a signal distribution unit, is hold by the at least one or by the plurality of fastening means.

6. The mobile communication antenna according to claim 5, characterized by the following feature:

the at least one fastening means is U-shaped or the plurality of fastening means are U-shaped.

7. The mobile communication antenna according to claim 1, characterized by the following features:

a first and a second profile arrangement are provided, which are arranged next to each other and which extend in the longitudinal direction of the mobile communication antenna;

the first and the second profile arrangement are arranged at least on a second side of the reflector arrangement, which is opposite the first side;

the first and/or the second profile arrangement are configured to receive an electronic module via the second side of the reflector arrangement;

the first profile arrangement is connected with:

a) the reflector arrangement; and/or b) the first support section of the first support frame structure;

the second profile arrangement is connected with:

a) the reflector arrangement; and/or b) the second support section of the first support frame structure.

8. The mobile communication antenna according to claim 7, characterized by the following features:

the first profile arrangement comprises a fastening area, wherein the fastening area comprises at least one first receiving groove or a at least one first receiving projection which extends in the longitudinal direction of the mobile communication antenna and is arranged on the first side of the reflector arrangement, wherein the first supporting section of the first support frame structure is arranged in the at least one first receiving groove or receives the first receiving projection; and/or the second profile arrangement comprises a fastening area, wherein the fastening area comprises at least one first receiving groove or a first receiving projection which extends in the longitudinal direction of the mobile communication antenna and is arranged on the first side of the reflector arrangement, wherein the second supporting section of the first support frame structure is arranged in the at least one first receiving groove or receives the first receiving projection.

9. The mobile communication antenna according to claim 8, characterized by the following feature:

the first support frame structure is attached in the respective first receiving groove and/or is attached to the first receiving projection of the first and second profile arrangement at a predetermined position or at an arbitrary position.

10. The mobile communication antenna according to claim 7, characterized by the following features:

the first profile arrangement encloses at least one first receiving room on the second side of the reflector arrangement, wherein the electronic module in form of a signal distribution unit is arranged in this at least one first receiving room; and/or the second profile arrangement encloses at least one first receiving room on the second side of the reflector arrangement, wherein the electronic module in form of a signal distribution unit is arranged in this at least one first receiving room.

11. The mobile communication antenna according to claim 3, characterized by the following features:

at least a third profile arrangement is provided;

the third profile arrangement is arranged at least on the second side of the reflector arrangement;

the third profile arrangement is arranged between the first and second profile arrangement and extends in the longitudinal direction of the mobile communication antenna;

the third profile arrangement is configured to receive an electronic module via the second side of the reflector arrangement;

the first profile arrangement is connected with:

a) the reflector arrangement; and/or b) the first support section of the first support frame structure and the first support section of the second support frame structure the second profile arrangement is connected with:

a) the reflector arrangement; and/or b) the second support section of the first support frame structure and the second support section of the third support frame structure;

the third profile arrangement is connected with;

a) the reflector arrangement; and/or b) the second support section of the second support frame structure and the first support section of the third support frame structure.

12. The mobile communication antenna according to claim 1, characterized by the following features:

the connecting element of the first support frame structure comprises a plurality of cross struts which are preferably U-shaped and extend from the first support section to the second support section;

the connecting element of the first support frame structure comprises one or more longitudinal struts extending in the longitudinal direction of the mobile communication antenna;

the one or more longitudinal struts connect the cross struts to each other.

13. The mobile communication antenna according to claim 12, characterized by the following features:

the at least one longitudinal strut or plurality of longitudinal struts are hollow, with a cable pull passing through them or with a coolant flowing through them; and/or the first and/or second support section of the first support frame structure comprises a hollow longitudinal strut through which a cable pull is passed or through which a coolant flows.

14. The mobile communication antenna according to claim 1, characterized by the following feature:

spacers are provided, which are arranged at the connecting element of the first support frame structure and point away from the reflector arrangement and are configured to keep a radome or radome foil at a distance from the plurality of dual-polarized radiators.

15. The mobile communication antenna according to claim 1, characterized by the following feature:

the first support frame structure comprises the plurality of dual-polarized radiators, each arranged in m columns, with m≥1, 2, 3, 4, wherein the dual-polarized radiators in the m columns are spaced apart from one another in the longitudinal direction of the mobile communication antenna.

16. The mobile communication antenna according to claim 15, characterized by the following features:

each dual-polarized radiator of the first support frame structure has a first connector for a first polarization and a second connector for a second polarization;

the respective first connectors of the dual-polarized radiators of a column are coupled to first terminals of a signal distribution unit for mobile radio signal transmission and the respective second connectors of the dual-polarized radiators of a column are coupled to second terminals of the signal distribution unit for mobile radio signal transmission.

17. The mobile communication antenna according to claim 16, characterized by the following features:

the respective signal distribution unit extends in the longitudinal direction of the mobile communication antenna and comprises:

a) a dual-signal distributor, wherein said one dual-signal distributor comprises said first and second terminals; or b) two single-signal distributors housed in separate enclosures, wherein the first single-signal distributor only comprises the first terminals and wherein the second single-signal distributor only comprises the second terminals.

18. The mobile communication antenna according to claim 17, characterized by the following features:

the dual-signal distributor comprises two housing halves and a partition wall arranged between them, thus forming two separate chambers;

a first phase shifter for mobile communication signals of a first polarization is arranged in the first chamber, wherein the plurality of ports of the first phase shifter are connected via the plurality of first terminals of the dual-signal distributor to the plurality of first connectors of the dual-polarized radiators of a column;

a second phase shifter for mobile communication signals of a second polarization is arranged in the second chamber, wherein the plurality of ports of the second phase shifter are connected via the plurality of second terminals of the dual-signal distributor to the plurality of second connectors of the dual-polarized radiators of a column;

or the first single-signal distributor comprises two housing halves, wherein:

a) a phase shifter for mobile communication signals of a first polarization is arranged between the two housing halves, wherein the plurality of ports of the phase shifter are connected via the plurality of first terminals of the first single-signal distributor to the plurality of first connectors of the dual-polarized radiators of a column; or b) partitions are arranged between the housing halves, thereby forming at least three separate chambers;

a first phase shifter for mobile communication signals of a first polarization and a first frequency range is arranged in the first chamber;

a second phase shifter for mobile communication signals of a first polarization and a second frequency range is arranged in the second chamber;

a printed circuit board arrangement or a sheet metal part arrangement or a coated plastic material arrangement is arranged in the third chamber and comprises a circuit structure configured to connect a respective one of the ports of the first phase shifter and a respective one of the ports of the second phase shifter to each other and to a respective first terminal of the first single-signal distributor, wherein the plurality of first terminals of the first single-signal distributor are connected to the plurality of first connectors of the dual-polarized radiators of a column;

and the second single-signal distributor comprises two housing halves, wherein:

a) a phase shifter for mobile communication signals of a second polarization is arranged between the two housing halves, wherein the plurality of ports of the phase shifter are connected via the plurality of second terminals of the second single-signal distributor to the plurality of second connectors of the dual-polarized radiators of a column; or b) partitions are arranged between the housing halves, thereby forming at least three separate chambers;

a first phase shifter for mobile communication signals of a second polarization and a first frequency range is arranged in the first chamber;

a second phase shifter for mobile communication signals of a second polarization and a second frequency range is arranged in the second chamber;

a printed circuit board arrangement or a sheet metal part arrangement or a coated plastic material arrangement is arranged in the third chamber which comprises a circuit structure configured to connect a respective one of the ports of the first phase shifter and a respective one of the ports of the second phase shifter to each other and to a respective second terminal of the second single-signal distributor, wherein the plurality of second terminals of the second single-signal distributor are connected to the plurality of second connectors of the dual-polarized radiators of a column.

19. The mobile communication antenna according to claim 15, characterized by the following features:

the first support frame structure is a single piece, wherein the plurality of dual-polarized radiators are arranged in m columns, with m≥1, 2, 3, 4;

or the first support frame structure is subdivided into several separate first support frame structure modules, which are arranged adjacent to each other in the longitudinal direction of the mobile communication antenna, whereby on each support frame structure module:

a) a dual-polarized radiator is arranged in each of the m columns, with m≥1, 2, 3, 4; or b) several dual-polarized radiators are spaced apart from one another in the longitudinal direction of the mobile communication antenna in the m columns, with m≥1, 2, 3, 4.

20. The mobile communication antenna according to claim 1, characterized by the following features:

the connecting element comprises a first and a second part perpendicular or predominantly perpendicular to the reflector arrangement;

fastening means is attached to the first and/or second support section and/or to the first and/or second perpendicular or predominantly perpendicular part;

the fastening means are configured to provide a releasable mechanical or fixed connection between the first support frame structure and another fastening means located at:

a) the reflector arrangement; and/or b) a first and/or second profile arrangement; and/or c) a second and/or third support frame structure; and/or d) a signal distribution unit.

21. The mobile communication antenna according to claim 1, characterized by the following features:

dual-polarized high band radiators are arranged on the first side of at least one part of the reflector arrangement;

the dual-polarized high band radiators are at least partially or completely arranged in the first receiving room of the first support frame structure.

22. The mobile communication antenna according to claim 20, characterized by the following feature:

the part of the reflector arrangement, on which the dual-polarized high band radiators are arranged is configured to be pulled out of the mobile communication antenna and to be replaced when the mobile communication antenna is mounted to a mast.

23. The mobile communication antenna according to claim 21, characterized by the following features:

active components are arranged on the second side of the part of the reflector arrangement, on which the dual-polarized high band radiators are arranged.

24. The mobile communication antenna according to claim 1, characterized by the following features:

a connection between the respective dual-polarized radiators on the first support frame structure and a signal distribution unit is free of cables and/or solder joints.

25. The mobile communication antenna according to claim 1, wherein the first support frame structure is made of a dielectric material.

26. The mobile communication antenna according to claim 25, the dual-polarized radiator that is mounted on the at least some or all of the mounting sections is mounted only on the at least some or all of the mounting sections.

27. The mobile communication antenna according to claim 1, wherein the first support frame structure comprises hollow portions through which a cable pull is passed.

* * * * *